(12) United States Patent
Rungta et al.

(10) Patent No.: US 11,722,275 B2
(45) Date of Patent: Aug. 8, 2023

(54) TECHNIQUES FOR SOUNDING REFERENCE SIGNAL CARRIER SWITCHING

(71) Applicant: QUALCOMM Incorporated, San Diego, CA (US)

(72) Inventors: Pranay Sudeep Rungta, San Diego, CA (US); Arvind Vardarajan Santhanam, San Diego, CA (US); Mona Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/315,142

(22) Filed: May 7, 2021

(65) Prior Publication Data

US 2022/0360388 A1    Nov. 10, 2022

(51) Int. Cl.
*H04L 5/00* (2006.01)
*H04L 25/02* (2006.01)
*H04W 72/23* (2023.01)
*H04W 72/51* (2023.01)
*H04B 7/0417* (2017.01)
*H04B 7/06* (2006.01)
*H04W 72/044* (2023.01)

(52) U.S. Cl.
CPC ......... *H04L 5/0048* (2013.01); *H04B 7/0417* (2013.01); *H04B 7/068* (2013.01); *H04B 7/0689* (2013.01); *H04L 5/0098* (2013.01); *H04L 25/0224* (2013.01); *H04W 72/23* (2023.01); *H04W 72/51* (2023.01); *H04W 72/044* (2013.01)

(58) Field of Classification Search
CPC ... H04L 5/0048; H04L 5/0096; H04L 5/0098; H04L 5/023; H04L 27/2611; H04L 27/2601; H04L 25/0202; H04L 25/0224; H04L 25/0226; H04L 25/0228; H04B 7/0417; H04B 7/068; H04B 7/0689; H04W 72/042; H04W 72/048; H04W 72/044
See application file for complete search history.

(56) References Cited

U.S. PATENT DOCUMENTS

| 2017/0324528 A1* | 11/2017 | Rico Alvarino | ........ H04L 5/001 |
| 2019/0372734 A1* | 12/2019 | Choi | ..................... H04B 7/0628 |
| 2021/0359882 A1* | 11/2021 | Liu | ......................... H04W 8/24 |
| 2022/0123891 A1* | 4/2022 | Ji | .......................... H04L 5/0051 |

* cited by examiner

*Primary Examiner* — Joshua Kading
(74) *Attorney, Agent, or Firm* — Holland & Hart LLP

(57) ABSTRACT

Methods, systems, and devices for wireless communication are described. A user equipment (UE) may be configured to transmit sounding reference signals (SRSs) on a first carrier over multiple symbols within a slot, the first carrier being different from a second carrier on which the UE communicates with a base station during the slot. For example, the base station may transmit, to the UE, an SRS configuration for the UE to transmit the SRSs. In accordance with the control message, the UE may tune to the first carrier and may transmit the SRSs over the multiple symbols within the slot on the first carrier before tuning back to the second carrier. In some examples, the UE may transmit a capability message to the base station indicating that the UE supports transmitting SRSs over multiple symbols within a slot before tuning back to a different carrier.

30 Claims, 18 Drawing Sheets

TECHNIQUES FOR SOUNDING REFERENCE SIGNAL CARRIER SWITCHING

TECHNICAL FIELD

The following relates to wireless communication, including techniques for sounding reference signal (SRS) carrier switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support communications between a UE and a base station on multiple carriers. In some cases, a UE may tune between carriers to transmit one or more sounding reference signals (SRSs) to a base station within a slot.

SUMMARY

The described techniques relate to improved methods, systems, devices, and apparatuses that support techniques for sounding reference signal (SRS) carrier switching. Generally, the described techniques provide for managing carrier switching associated with transmitting SRSs. For example, a user equipment (UE) may communicate with a base station on a first carrier. The base station may configure (e.g., trigger) the UE to transmit SRSs on a second carrier over multiple symbols within a slot, such that the UE tunes from the first carrier to the second carrier to transmit the SRSs. To configure the UE, the base station may transmit a control message (e.g., on the first carrier) that indicates an SRS configuration for the UE to transmit the SRSs on the second carrier. In response to receiving the SRS configuration, the UE may tune to the second carrier (e.g., switch from the first carrier to the second carrier) and may transmit the SRSs over the multiple symbols within the slot on the second carrier before tuning (e.g., switching) back to the first carrier. That is, the UE may remain tuned to the second carrier to transmit the SRSs over the multiple symbols without tuning back to the first carrier during the transmission of the SRSs over the multiple symbols. In some examples, the UE may transmit a capability message to the base station indicating that the UE supports remaining tuned to the second carrier to transmit the SRSs and may transmit the SRSs in accordance with the capability message.

A method for wireless communication at a user equipment (UE) is described. The method may include receiving a control message that indicates a sounding reference signal (SRS) configuration for the UE to transmit SRSs on a first carrier over multiple symbols within a slot, where the first carrier is different from a second carrier on which the UE communicates with a base station during the slot, tuning to the first carrier based on the control message and in accordance with the control message, and transmitting the SRSs over the multiple symbols within the slot on the first carrier before tuning back to the second carrier.

An apparatus for wireless communication at a UE is described. The apparatus may include at least one processor, memory coupled with the at least one processor, and instructions stored in the memory. The instructions may be executable by the processor to cause the apparatus to receive a control message that indicates an SRS configuration for the UE to transmit SRSs on a first carrier over multiple symbols within a slot, where the first carrier is different from a second carrier on which the UE communicates with a base station during the slot, tune to the first carrier based on the control message and in accordance with the control message, and transmit the SRSs over the multiple symbols within the slot on the first carrier before tuning back to the second carrier.

Another apparatus for wireless communication at a UE is described. The apparatus may include means for receiving a control message that indicates an SRS configuration for the UE to transmit SRSs on a first carrier over multiple symbols within a slot, where the first carrier is different from a second carrier on which the UE communicates with a base station during the slot, means for tuning to the first carrier based on the control message and in accordance with the control message, and means for transmitting the SRSs over the multiple symbols within the slot on the first carrier before tuning back to the second carrier.

A non-transitory computer-readable medium storing code for wireless communication at a UE is described. The code may include instructions executable by at least one processor to receive a control message that indicates an SRS configuration for the UE to transmit SRSs on a first carrier over multiple symbols within a slot, where the first carrier is different from a second carrier on which the UE communicates with a base station during the slot, tune to the first carrier based on the control message and in accordance with the control message, and transmit the SRSs over the multiple symbols within the slot on the first carrier before tuning back to the second carrier.

Some examples of the method, apparatuses, and non-transitory computer-readable medium described herein may further include operations, features, means, or instructions for transmitting a capability message indicating that the UE supports tuning to a different carrier once per slot to transmit one or more SRSs, where transmitting the SRSs over the multiple symbols within the slot on the first carrier before tuning back to the second carrier may be in accordance with the capability message.

Some examples of the method, apparatuses, and non-transitory computer-readable medium described herein may further include operations, features, means, or instructions for transmitting a capability message indicating a duration for which the UE remains tuned to the first carrier after tuning to the first carrier, where transmitting the SRSs over the multiple symbols within the slot on the first carrier before tuning back to the second carrier may be in accordance with the capability message.

Some examples of the method, apparatuses, and non-transitory computer-readable medium described herein may further include operations, features, means, or instructions for determining that the UE completes transmission of the SRSs over the multiple symbols and tuning back to the second carrier before the duration expires based on the determining.

Some examples of the method, apparatuses, and non-transitory computer-readable medium described herein may further include operations, features, means, or instructions for receiving, from the base station, an indication of a duration for which the UE may be to remain tuned to the first carrier after tuning to the first carrier, where transmitting the SRSs over the multiple symbols within the slot on the first carrier before tuning back to the second carrier may be in accordance with the indication of the duration.

Some examples of the method, apparatuses, and non-transitory computer-readable medium described herein may further include operations, features, means, or instructions for receiving the indication of the duration includes receiving the indication of the duration in the SRS configuration.

In some examples of the method, apparatuses, and non-transitory computer-readable medium described herein, the multiple symbols within the slot may be discontinuous symbols.

In some examples of the method, apparatuses, and non-transitory computer-readable medium described herein, at least two symbols of the multiple symbols within the slot may be continuous symbols.

In some examples of the method, apparatuses, and non-transitory computer-readable medium described herein, the SRS configuration includes an allocation of resources for transmitting the SRSs on the first carrier over the multiple symbols.

In some examples of the method, apparatuses, and non-transitory computer-readable medium described herein, the first carrier may be configured for downlink carrier aggregation.

A method for wireless communication at a base station is described. The method may include receiving, from a UE, a capability message indicating that the UE supports transmitting sounding reference signals (SRSs) on a first carrier over multiple symbols within a slot before tuning back to a second carrier different from the first carrier on which the base station communicates with the UE during the slot, transmitting, to the UE, a control message that indicates an SRS configuration for the UE to transmit the SRSs on the first carrier over the multiple symbols within the slot, and receiving the SRSs over the multiple symbols within the slot on the first carrier in accordance with the capability message.

An apparatus for wireless communication at a base station is described. The apparatus may include at least one processor, memory coupled with the at least one processor, and instructions stored in the memory. The instructions may be executable by the processor to cause the apparatus to receive, from a UE, a capability message indicating that the UE supports transmitting sounding reference signals (SRSs) on a first carrier over multiple symbols within a slot before tuning back to a second carrier different from the first carrier on which the base station communicates with the UE during the slot, transmit, to the UE, a control message that indicates an SRS configuration for the UE to transmit the SRSs on the first carrier over the multiple symbols within the slot, and receive the SRSs over the multiple symbols within the slot on the first carrier in accordance with the capability message.

Another apparatus for wireless communication at a base station is described. The apparatus may include means for receiving, from a UE, a capability message indicating that the UE supports transmitting sounding reference signals (SRSs) on a first carrier over multiple symbols within a slot before tuning back to a second carrier different from the first carrier on which the base station communicates with the UE during the slot, means for transmitting, to the UE, a control message that indicates an SRS configuration for the UE to transmit the SRSs on the first carrier over the multiple symbols within the slot, and means for receiving the SRSs over the multiple symbols within the slot on the first carrier in accordance with the capability message.

A non-transitory computer-readable medium storing code for wireless communication at a base station is described. The code may include instructions executable by at least one processor to receive, from a UE, a capability message indicating that the UE supports transmitting sounding reference signals (SRSs) on a first carrier over multiple symbols within a slot before tuning back to a second carrier different from the first carrier on which the base station communicates with the UE during the slot, transmit, to the UE, a control message that indicates an SRS configuration for the UE to transmit the SRSs on the first carrier over the multiple symbols within the slot, and receive the SRSs over the multiple symbols within the slot on the first carrier in accordance with the capability message.

In some examples of the method, apparatuses, and non-transitory computer-readable medium described herein, the capability message indicates that the UE supports tuning to a different carrier once per slot to transmit one or more SRSs.

In some examples of the method, apparatuses, and non-transitory computer-readable medium described herein, the capability message indicates a duration for which the UE remains tuned to the first carrier after tuning to the first carrier.

Some examples of the method, apparatuses, and non-transitory computer-readable medium described herein may further include operations, features, means, or instructions for transmitting, to the UE, an indication of a duration for which the UE may be to remain tuned to the first carrier after tuning to the first carrier, where receiving the SRSs over the multiple symbols within the slot on the first carrier may be in accordance with the indication of the duration.

Some examples of the method, apparatuses, and non-transitory computer-readable medium described herein may further include operations, features, means, or instructions for transmitting the indication of the duration includes transmitting the indication of the duration in the SRS configuration.

In some examples of the method, apparatuses, and non-transitory computer-readable medium described herein, the multiple symbols within the slot may be discontinuous symbols.

In some examples of the method, apparatuses, and non-transitory computer-readable medium described herein, at least two symbols of the multiple symbols within the slot may be continuous symbols.

In some examples of the method, apparatuses, and non-transitory computer-readable medium described herein, the SRS configuration includes an allocation of resources for transmitting the SRSs on the first carrier over the multiple symbols.

In some examples of the method, apparatuses, and non-transitory computer-readable medium described herein, the first carrier may be configured for downlink carrier aggregation.

DETAILED DESCRIPTION

Figure 1:
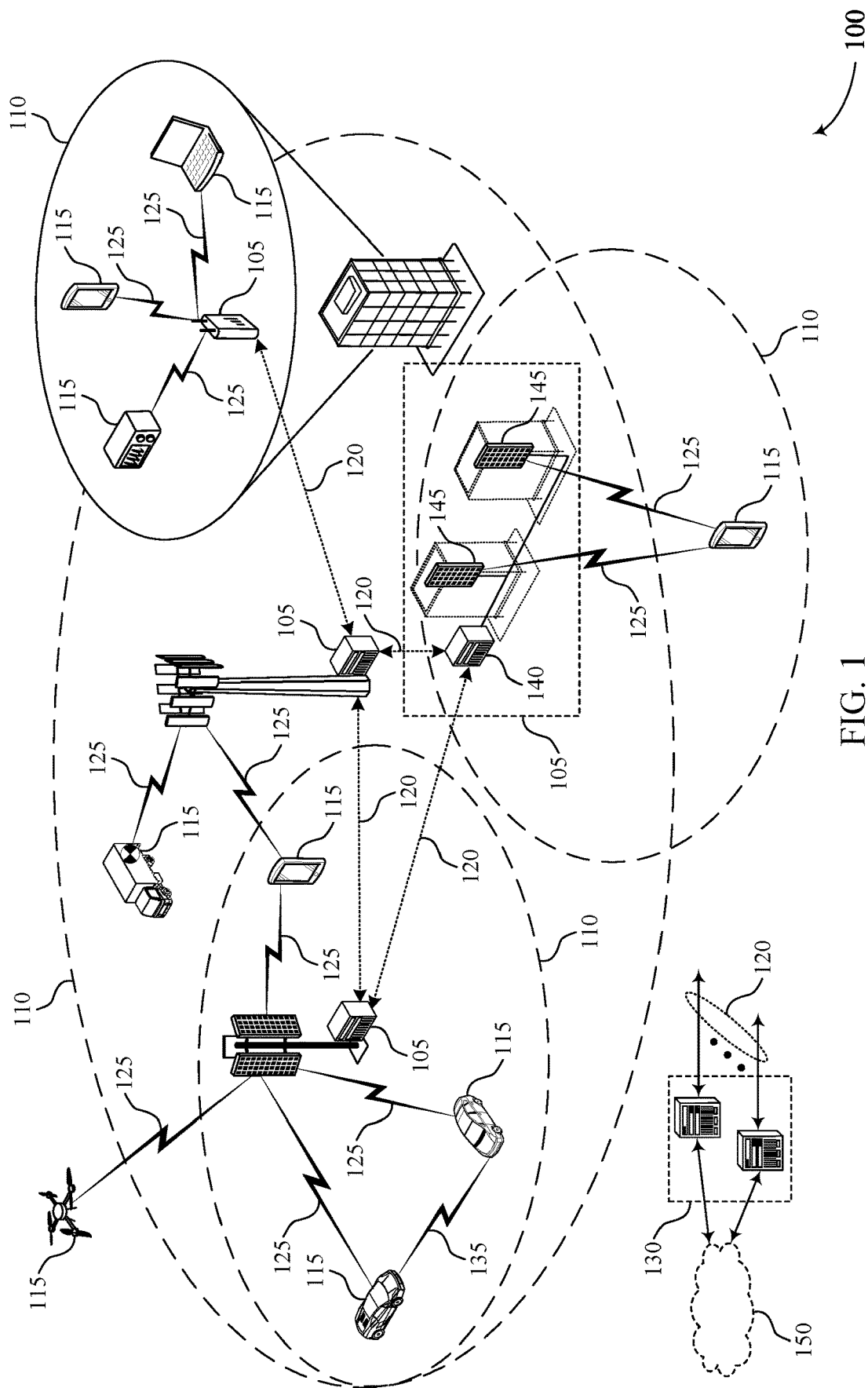
FIGS. 1 and 2 illustrate examples of wireless communications systems that supports techniques for sounding reference signal (SRS) carrier switching in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, a wireless communications system may support sounding reference signal (SRS) transmissions to facilitate various operations performed by the wireless communications system. For example, SRS transmissions by a UE to a base station may facilitate channel estimation (e.g., estimation of channel quality, channel conditions, signal-to-interference-plus-noise ratio (SINR), and/or reference signal received power, among other channel characteristics), downlink beamforming for physical downlink shared channel (PDSCH) transmissions, or codebook-based physical uplink shared channel (PUSCH) transmissions, among other operations. In an example, a UE may alternate SRS transmissions to a base station over antenna ports used to receive PDSCH transmissions (e.g., via receive antennas) to facilitate downlink beamforming for PDSCH transmissions by enabling the base station to estimate channel characteristics associated with different downlink beams and to select downlink beams for the PDSCH transmissions based on the estimation. In some cases, alternating SRS transmissions over different antenna ports may be referred to as SRS antenna switching.

In some cases, a UE and a base station may additionally implement carrier switching to communicate SRSs. Here, the UE and the base station may communicate over a first carrier. To transmit an SRS to the base station, the UE may switch from the first carrier to a second carrier (e.g., a carrier configured for downlink transmissions) and may transmit the SRS on the second carrier. The base station may measure the SRS transmitted by the UE to obtain channel state information (CSI) associated with the second carrier (e.g., due to time division duplexing (TDD) reciprocity). That is, the UE may temporarily switch to a downlink carrier to transmit the SRS to the base station, and the base station may perform channel estimation based on the SRS to obtain CSI associated with the downlink carrier.

To switch carriers, the UE may tune its radio frequency circuitry from the first carrier to second carrier over a tuning time during which the UE may not transmit messages on either carrier. In some examples, the UE may be configured to transmit multiple SRSs on the second carrier (e.g., the downlink carrier). In some cases, the UE may tune back and forth between the first carrier and the second carrier for each SRS transmitted on the second carrier. For example, to transmit an SRS on the second carrier, the UE may tune from the first carrier to the second carrier to transmit the SRS and may tune back to the first carrier after transmitting the SRS. To transmit two SRSs within a same slot (e.g., over two symbols within the slot), the UE may tune from the first carrier to the second carrier to transmit an SRS in a first symbol within the slot, tune back to the first carrier after transmitting the SRS in the first symbol, tune back to the second carrier to transmit an SRS in a second symbol within the slot, and tune back to the first carrier after transmitting the SRS in the second symbol. This may increase an amount of time during which the UE may not transmit messages, for example, due to increasing an amount of time that the UE spends tuning between carriers, thereby reducing resource utilization efficiency, capacity, and spectral efficiency and increasing latency and power consumption. Additionally, the tuning time to switch between carriers may span one or more symbols in the time domain. Therefore, because the scheduling of SRSs may be limited to some symbols within a slot (e.g., the six temporally last symbols within the slot), tuning between carriers between each SRS transmission within a slot may reduce a quantity of SRSs that the UE may transmit within the slot.

Techniques, systems, and devices are described herein to manage carrier switching during transmission of SRSs within a slot to reduce latency and increase resource usage associated with transmitting SRSs over multiple symbols within the slot. For example, a base station may configure (e.g., trigger) a UE to transmit SRSs on a first carrier over multiple symbols within a slot, where the UE tunes from a second carrier to the first carrier to transmit the SRSs. To configure the UE, the base station may transmit a control message (e.g., on the second carrier, on some other carrier) that indicates an SRS configuration for the UE to transmit the SRSs on the first carrier. In response to receiving the SRS configuration, the UE may tune to the first carrier (e.g., switch from the second carrier to the first carrier) and may transmit the SRSs over the multiple symbols within the slot on the first carrier before tuning (e.g., switching) back to the second carrier. That is, the UE may remain tuned to the first carrier to transmit the SRSs over the multiple symbols without tuning back to the second carrier during the transmission of the SRSs over the multiple symbols. In some examples, the UE may transmit a capability message to the base station indicating that the UE supports remaining tuned to the first carrier to transmit the SRSs and may transmit the SRSs in accordance with the capability message.

The UE may remain tuned to the first carrier according to different behaviors. In some examples, the UE may support a single tune per slot to transmit SRSs. Accordingly, in response to receiving the control message, the UE may tune to the first carrier one time within the slot to transmit the SRSs over the multiple symbols.

In some other examples, the UE may support remaining tuned to the first carrier for some duration (e.g., a quantity of symbols, a quantity of microseconds (μs), or some other duration). Here, the UE may tune to the first carrier for at least part of the duration and may transmit the SRSs over the multiple symbols while tuned to the first carrier.

Aspects of the subject matter described in this disclosure may be implemented to realize one or more of the following potential improvements, among others. The techniques employed by the communication devices may provide benefits and enhancements to the operation of the communication devices. For example, operations performed by the communication devices may provide improvements to SRS transmissions involving carrier switching. In some examples, remaining tuned to a carrier to transmit SRSs over multiple symbols within a slot may reduce a switching frequency associated with transmitting the SRSs thus reducing a time during which the UE tunes from one carrier to another carrier. This may result in increased data rates, resource utilization efficiency, capacity, and spectral efficiency. In some other examples, remaining tuned to a carrier to transmit SRSs over multiple symbols within a slot may provide improvements to latency, power consumption, coordination between devices, battery life, and processing capability, among other benefits.

Aspects of the disclosure are initially described in the context of wireless communications systems. Aspects of the disclosure are additionally described in the context of a slot diagram and a process flows. Aspects of the disclosure are further illustrated by and described with reference to apparatus diagrams, system diagrams, and flowcharts that relate to techniques for SRS carrier switching.

FIG. 1 illustrates an example of a wireless communications system 100 that supports techniques for SRS carrier switching in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may transmit an SRS using a predetermined sequence (e.g., a Zadoff-Chu sequence) so that a base station 105 may estimate uplink channel quality and/or downlink channel quality. In some examples, an SRS may be scheduled on multiple antenna ports and still considered to be a single SRS transmission. An SRS transmission may be categorized as a Type 0 (periodically transmitted at equally spaced intervals) SRS or as a Type 1 (aperiodic) SRS. In either case, the base station 105 may control the timing of SRS transmissions by notifying (e.g., via an SRS configuration message) the UE 115 of which TTIs (e.g., subframes) may support the transmission of the SRS. Additionally, a sounding period (e.g., 2 to 230 subframes) and an offset within the sounding period may be configured for the UE 115. As a result, the UE 115 may transmit the SRS when a subframe that supports SRS transmissions coincides with the configured sounding period. In some cases, SRSs may be transmitted during particular symbols of the subframe (e.g., during one or more of the six temporally last OFDM symbol of the subframe) or, in some cases, may be sent during an uplink portion of a special subframe. Data gathered by a base station 105 from an SRS may be used to inform the scheduling of uplink transmissions by the UE 115, such as frequency dependent transmissions. A base station 105 may also utilize an SRS to check timing alignment status and send time alignment commands to the UE 115.

A UE 115 may also be configured with SRS resources to support SRS antenna switching. SRS antenna switching may facilitate downlink beamforming by enabling a base station 105 to estimate the downlink channel quality on a particular serving cell. For example, a UE 115 may alternate SRS transmissions to a base station 105 over different antenna ports used to receive PDSCH transmissions (e.g., via receive antennas). The base station 105 may estimate channel characteristics associated with different downlink beams corresponding to the SRSs transmissions and may select downlink beam(s) for the PDSCH transmissions based on the estimation (e.g., may select downlink beam(s) having relatively higher channel quality). The SRS resources configured for SRS antenna switching may be based on various SRS antenna switching configurations supported by the UE 115 (e.g., as indicated by the UE 115 via a capability message). For example, SRS antenna switching configurations supported by a UE 115 may include a "1t2r" configuration, a "1t4r" configuration, or a "2t4r" configuration, among other SRS antenna switching configurations, where and "t" refers to a quantity of transmit antenna ports at the UE 115 that may be used for SRS antenna switching and "r" refers to a quantity of receive antenna ports at the UE 115 that may be used for SRS antenna switching. The configured SRS resources may be based on which SRS antenna switching configurations are supported by the UE 115.

To implement SRS antenna switching using configured SRS resources, a UE 115 may assign each SRS resource to one of the receive antenna ports of the UE 115, switch its transmit antenna port to a receive antenna port, and transmit an SRS using the receive antenna port. In an example, if a UE 115 supports and is configured with a 1t4r SRS antenna switching configuration, a base station 105 may configure the UE 115 with four SRS resources over which the UE 115 may transmit SRSs. The UE 115 may map each of its four receive antenna ports to a single resource of the four resources and may switch its transmit antenna port to the transmit an SRS on the mapped single resource. In some examples, the UE 115 may transmit an SRS using the transmit antenna port for one resource of the four resources and may switch the transmit antenna port to transmit an SRS using each of the other three resources.

A UE 115 and a base station 105 may support carrier switching to communicate SRSs. For example, the UE 115 may not support simultaneous transmission of an SRS on a first carrier and uplink transmissions (e.g., physical uplink control channel (PUCCH) transmissions, physical uplink shared channel (PUSCH) transmissions, or some other uplink transmission) on a second carrier. Accordingly, the UE 115 may pause (e.g., interrupt, suspend) transmissions on the second carrier to transmit the SRS on the first carrier. Here, to transmit the SRS on the first carrier, the UE 115 may switch from the second carrier to first carrier by tuning its radio frequency circuitry from the second carrier to the first carrier over some tuning time. In some examples, tuning between carriers may include tuning the radio frequency circuitry (e.g., components of a transmit antenna) to a center frequency of the tuned-to carrier, a bandwidth of the tuned-to carrier, a transmission power (e.g., a power class) associated with the tuned-to carrier (which may include activating or deactivating components of the radio frequency circuitry to support the transmission power), or a combination thereof over the tuning time. The UE 115 may support different tuning times based on a capability of the UE 115. For example, the UE 115 may support a tuning time of 30 μs, 100 μs, 140 μs, 200 μs, 300 μs, 500 μs, 900 μs, or some other tuning time. The UE 115 may transmit a capability message (e.g., via RRC signaling) to the base station 105 to indicate the tuning time supported by the UE 115. In some examples, the UE 115 may support different tuning times associated with switching to/from downlink carriers and switching to/from uplink carriers. For example, the capability message may include a switchingTimeDL parameter to indicate the interruption to downlink during the tuning time and/or a switchingTimeUL parameter to indicate the interruption to the uplink during the tuning time. During the tuning time, the UE 115 may suspend transmission of uplink messages on either carrier.

Carrier switching may enable the base station 105 to obtain CSI associated with a carrier not configured for uplink transmissions. For example, the UE 115 may switch from an uplink carrier to a downlink carrier, such as a carrier configured for downlink carrier aggregation or some other downlink carrier, to transmit an SRS. Due to TDD channel reciprocity (i.e., a TDD uplink message on a channel may be used to estimate channel characteristics associated with TDD downlink messages transmitted on the channel, or vice versa), by receiving the SRS on the downlink carrier, the base station 105 may obtain CSI for the downlink carrier (e.g., via channel estimation based on the SRS).

Various aspects of the described techniques support managing carrier switching during transmission of SRSs within a slot. For example, a base station 105 and a UE 115 may communicate on a first carrier, and the base station 105 may configure (e.g., trigger) the UE 115 to transmit SRSs on a second carrier over multiple symbols within a slot by transmitting a control message (e.g., on the first carrier, on some other carrier) that indicates an SRS configuration for the UE 115 to transmit the SRSs on the second carrier. In response to the control message, the UE 115 may tune from the first carrier to the second carrier and may transmit the SRSs over the multiple symbols within the slot on the second carrier before tuning back to the first carrier. In some examples, the UE 115 may transmit a capability message to the base station 105 indicating that the UE 115 supports remaining tuned to the second carrier to transmit the SRSs and may transmit the SRSs in accordance with the capability message.

Figure 2:
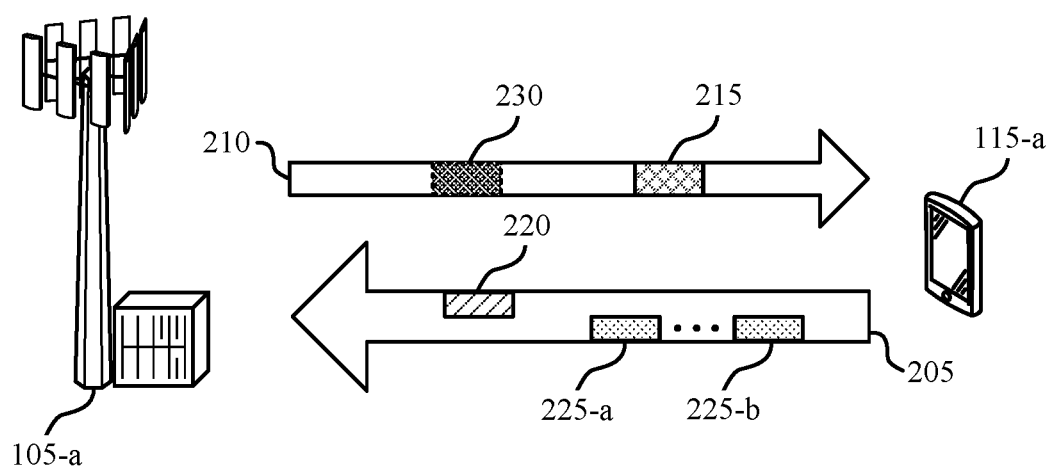

FIG. 2 illustrates an example of a wireless communications system 200 that supports techniques for SRS carrier switching in accordance with aspects of the present disclosure. The wireless communications system 200 may implement aspects of the wireless communications system 100 or may be implemented by aspects of the wireless communications system 100. For example, the wireless communications system 200 may include a base station 105-*a* and a UE 115-*a*, which may be examples of the corresponding devices described with reference to FIG. 1. In some examples, the wireless communications system 200 may support multiple RATs including 4G systems such as LTE systems, LTE-A systems, or LTE-A Pro systems, and 5G systems which may be referred to as NR systems. In some cases, the base station 105-*a* and the UE 115-*a* may support carrier switching management associated with communicating SRSs 225 to provide improvements to latency, data rates, resource usage, spectral efficiency, power consumption, coordination between the base station 105-*a* and the UE 115-*a*, and processing capability, among other benefits.

The wireless communications system 200 may support communications between the base station 105-*a* and the UE 115-*a*. For example, the UE 115-*a* may transmit uplink messages to the base station 105-*a* over an uplink channel 205, and the base station 105-*a* may transmit downlink messages to the UE 115-*a* over a downlink channel 210. The uplink channel 205 may be an example of a physical uplink channel such as a PUCCH, a PUSCH, a physical random access channel (PRACH), or some other physical uplink channel. The downlink channel 210 may be an example of a physical downlink channel such as a physical downlink control channel (PDCCH), a PDSCH, a PRACH, a physical broadcast channel (PBCH), or some other physical downlink channel.

The UE 115-*a* and the base station 105-*a* may communicate on multiple carriers over the uplink channel 205 and the downlink channel 210. For example, the base station 105-*a* may transmit downlink messages on one or more downlink carriers and the UE 115-*a* may transmit uplink messages on one or more uplink carriers. In some examples, a carrier may support communications of both downlink messages and uplink messages (e.g., in a TDD mode) and the base station 105-*a* and the UE 115-*a* may communicate both downlink messages and uplink messages on the carrier.

The UE 115-*a* may support SRS antenna switching to transmit one or more SRSs 225 to the base station 105-*a*. The UE 115-*a* may additionally support carrier switching to transmit the one or more SRSs 225 to the base station 105-*a*. For example, the UE 115-*a* may transmit uplink messages (e.g., PUCCH transmissions, PUSCH transmissions, PRACH transmissions, or some other uplink message) to the base station 105-*a* on a first carrier (e.g., an uplink carrier, a TDD carrier that supports both uplink and downlink communications). The base station 105-*a* may transmit a control message 215 to the UE 115-*a* that indicates (e.g., includes) an SRS configuration for the UE 115-*a* to transmit, to the base station 105-*a*, SRSs 225 over multiple symbols within a slot and on a second carrier that is different than the first carrier. For example, the control message 215 may indicate for the UE 115-*a* to transmit SRS 225-*a* through SRS 225-*b* on the second carrier over multiple symbols within the slot, where SRS 225-*a* through SRS 225-*b* may include any quantity of two or more SRSs 225. In some examples, the second carrier may be a downlink carrier that is not configured for (e.g., does not support) uplink transmissions (e.g., an FDD downlink carrier). In some cases, the second carrier may be a downlink carrier configured for downlink carrier aggregation. In some examples, the base station 105-*a* may transmit the control message 215 on the first carrier (e.g., if it is a TDD carrier) or on a carrier different than the first carrier and the second carrier (e.g., a second downlink carrier, a second TDD carrier). In some cases, the base station 105-*a* may transmit the control message 215 in downlink control information (DCI), RRC signaling, or a MAC-control element.

In some examples, the SRS configuration may include an allocation of resources (e.g., time resources, frequency resources, code resources, spatial resources, or a combination thereof) for transmitting the SRSs 225 on the second carrier over the multiple symbols. In some cases, the SRS configuration may indicate the carrier to which the UE is to switch to transmit the SRSs 225 (e.g., the second carrier), a time to switch to the second carrier, the symbols over which to transmit the SRSs 225, or a combination thereof. In some examples, the control message 215 may trigger the transmission of the SRSs 225. In some other examples, the control message 215 may configure periodic or semi-persistent transmission of the SRSs 225 on the second carrier.

The UE 115-*a* may transmit the SRSs 225 based on the control message 215. For example, in response to receiving the control message 215, the UE 115-*a* may tune from the first carrier to the second carrier in accordance with the SRS configuration. The UE 115-*a* may transmit the SRSs 225 over the multiple symbols within the slot (e.g., the SRS 225-*a* over a first symbol and the SRS 225-*b* over a second symbol) before tuning back to the first carrier. That is, the UE 115-*a* may remain tuned to the second carrier to transmit the SRSs 225 over the multiple symbols (e.g., and refrain from tuning to the first carrier between SRS transmissions).

The UE 115-*a* may remain tuned to the second carrier according to various behaviors. In a first example, the UE 115-*a* may support a single tune per slot to transmit SRSs 225. That is, the UE 115-*a* may tune to the second carrier one time within the slot to transmit the SRSs 225 over the multiple symbols. In some examples, such a behavior may be an expected (e.g., defined or standardized) behavior of the UE 115-*a* that is followed without prior signaling between the UE 115-*a* and the base station 105-*a*. In some other examples, the UE 115-*a* may transmit a capability message 220 to the base station 105-*a* indicating that the UE 115-*a* supports tuning to a different carrier once per slot to transmit one or more SRSs 225. Accordingly, in response to receiving the control message 215, the UE 115-*a* may tune to the second carrier and remain tuned to the second carrier to transmit the SRSs 225 over the multiple symbols. After transmitting the SRSs 225 over the multiple symbols, the UE 115-*a* may tune back to the first carrier. In some cases, the UE 115-*a* may transmit the capability message 220 via RRC signaling. In some instances, the capability message 220 may include an srs-CarrSwitchingSingleTunePerSlot parameter that indicates whether the UE 115-*a* supports the single tune per slot to transmit the SRSs 225. In some examples, the UE 115-*a* may transmit the capability message 220 on the first carrier.

In a second example, the UE 115-*a* may support remaining tuned to the second carrier for some duration (e.g., a quantity of symbols, a quantity of µs, or some other duration). For example, the UE 115-*a* may transmit the capability message 220 to indicate a duration for which the UE 115-*a* remains tuned to the second carrier after tuning to the second carrier or after transmitting an SRS 225 over a temporally first symbol of the multiple symbols. Accordingly, the UE 115-*a* may remain tuned to the second carrier for at least part of the indicated duration to transmit the SRSs 225 over the multiple symbols. In some cases, the UE 115-*a* may determine that is completes transmission of the SRSs 225 over the multiple symbols before the duration expires. Here, in some cases, the UE 115-*a* may tune back to the first carrier after transmitting the SRSs 225 and before the duration expires in response to the determining. In some examples, if the control message 215 indicates the UE 115-*a* to transmit a single SRS 225 over a single symbol, the UE 115-*a* tune back to the first carrier after transmitting the single SRS 225, for example, without remaining tuned to the second carrier for the duration. In some examples, the duration may be based on a RAT supported by the UE 115-*a*. For example, the UE 115-*a* may support a first duration that is specific to a first RAT (e.g., an NR system) and a second duration that is specific to a second RAT (e.g., a 4G system, an E-UTRA system). The capability message 220 may include one or more of a first srs-TimeToStayTuned parameter to indicate the first duration and a second srs-TimeToStayTuned parameter to indicate the second duration. In some cases, the UE 115-*a* may transmit the capability message 220 via RRC signaling.

Alternatively, a network (e.g., via the base station 105-*a*) may indicate a duration for which the UE 115-*a* remains tuned to the second carrier after tuning to the second carrier or after transmitting an SRS 225 over a temporally first symbol of the multiple symbols. For example, the base station 105-*a* may transmit a duration indication 230 that indicates the duration to the UE 115-*a*. Accordingly, in response to receiving the control message 215, the UE 115-*a* may remain tuned to the second carrier for the duration to transmit the SRSs 225 over the multiple symbols. Upon expiration of the duration, the UE 115-*a* may tune back to the first carrier. In some examples, the base station 105-*a* may transmit the duration indication in the SRS configuration. That is, the SRS configuration may be included in the SRS configuration (e.g., rather than in a separate message). In some examples, the duration may be based on a RAT supported by the UE 115-*a* and the base station 105-*a*. For example, the base station 105-*a* may indicate a first duration that is specific to a first RAT (e.g., an NR system) and a second duration that is specific to a second RAT (e.g., a 4G system, an E-UTRA system). The capability message 220 may include one or more of a first srs-TimeToStayTuned parameter to indicate the first duration and a second srs-TimeToStayTuned parameter to indicate the second duration. In some cases, the base station 105-*a* may transmit the duration indication 230 via RRC signaling.

Figure 3:
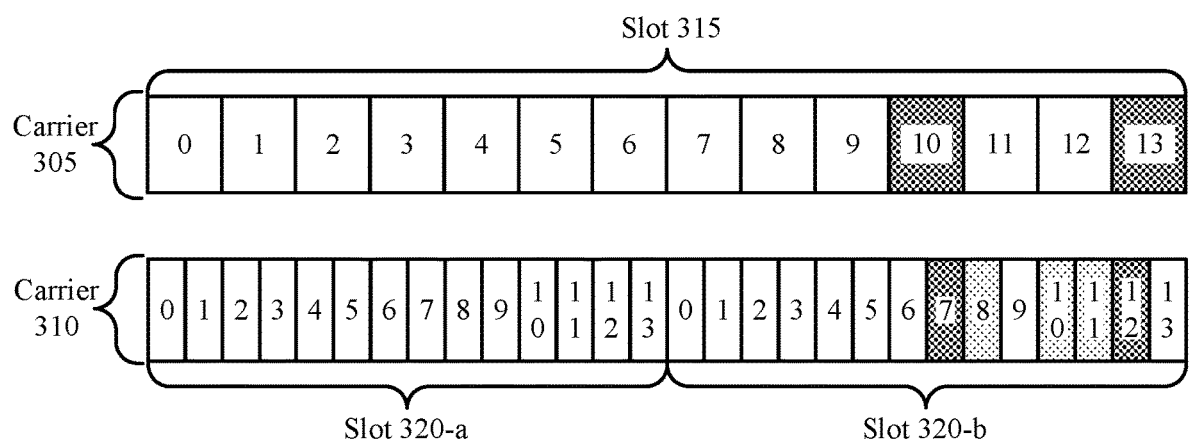
FIG. 3 illustrates an example of a slot diagram that supports techniques for SRS carrier switching in accordance with aspects of the present disclosure.

FIG. 3 illustrates an example of a slot diagram 300 that supports techniques for SRS carrier switching in accordance with aspects of the present disclosure. The slot diagram 300 may implement aspects of the wireless communications systems 100 and 200 or may be implemented by aspects of the wireless communications system 100 and 200 as described with reference to FIGS. 1 and 2, respectively. For example, the slot diagram 300 may be implemented by a UE 115 and a base station 105 to support carrier switching management associated with communicating SRSs.

The slot diagram 300 depicts a carrier 305 and a carrier 310 over which the UE 115 may communicate with the base station 105. The horizontal axis may represent time, and the vertical axis may represent frequency. For example, the carrier 305 may be an example of an uplink carrier or a TDD carrier on which the UE 115 may transmit uplink messages, and the carrier 310 may be an example of a downlink carrier on which the base station 105 may transmit downlink messages. The carrier 305 may have a first numerology and be configured for a first mode (e.g., a TDD mode, an FDD mode) and the carrier 310 may have a second numerology and be configured for a second mode (e.g., a TDD mode). For illustrative purposes, the example of FIG. 3 depicts the carrier 305 as having different numerologies, however, it is noted that the carrier 305 and the carrier 310 may have the same numerology in some examples. In some examples, the first numerology may correspond to a subcarrier spacing of 15 kilohertz (kHz) and the second numerology may correspond to a subcarrier spacing of 30 kHz.

The slot diagram 300 additionally depicts the carrier 305 as including a slot 315 and the carrier 310 as including a slot 320-a and a slot 320-b. Each slot may include a quantity of symbols. For example, the slot 315, the slot 320-a, and the slot 320-b may each include symbols 0 through 13. The slot 315 may overlap with the slot 320-a and the slot 320-b in the time domain. For example, symbols 0 through 6 of slot 315 may overlap with symbols 0 through 13 of slot 320-a, and symbols 7 through 13 of slot 315 may overlap with symbols 0 through 13 of slot 320-b. In some examples, slot 315 may span a first duration (e.g., 1 ms) in the time domain based on the carrier 305 having the first numerology, and slot 320-a and slot 320-b may span a second duration (e.g., 500 μs) in the time domain based on the carrier 310 having the second numerology.

The UE 115 may support carrier switching to transmit one or more SRSs on the carrier 310. For example, the UE 115 may be configured (e.g., triggered) to tune from the carrier 305 to the carrier 310 to transmit SRSs over multiple symbols of the slot 320-b. The multiple symbols may be discontinuous in the time domain, continuous in the time domain, or a combination thereof. For instance, in the example of FIG. 3, the UE 115 may be configured to transmit an SRS on symbol 8 of slot 320-b, an SRS on symbol 10 of slot 320-b, and an SRS on symbol 11 or slot 320-b. Here, symbol 8 may be discontinuous with symbol 10 and symbol 11 in the time domain, and symbol and symbol 11 may continuous in the time domain. It is noted that while FIG. 3 depicts transmitting SRSs over one discontinuous symbol and two continuous symbols, any combination of continuous and/or discontinuous symbols is possible.

To transmit the SRSs on the carrier 310, the UE 115 may tune from the carrier 305 to the carrier 310 over some tuning time. During the tuning time, the UE 115 may suspend (e.g., interrupt, pause, stop) transmissions on both the carrier 305 and the carrier 310. The UE 115 may begin tuning to the carrier 310 a duration before the first SRS transmission such that the UE 115 completes tuning to the carrier 310 before symbol over which the UE 115 transmits the first SRS. For example, if the UE 115 may tune to the carrier 310 within one symbol period of the slot 320-b, the UE 115 may begin tuning to the carrier 310 at some time during symbol 10 of slot 315 such that the UE 115 may complete tuning to the carrier 310 before symbol 8 of slot 320-b. As a result, the UE 115 may suspend communications on the carrier 305 and the carrier 310 in symbol 10 of slot 315 and symbol 7 of slot 320-b.

After tuning to the carrier 310, the UE 115 may transmit the SRSs over the multiple symbols of slot 320-b. For example, the UE 115 may transmit a first SRS over symbol 8, a second SRS over symbol 10, and a third SRS over symbol 11. The UE 115 may remain tuned to the carrier 310 to transmit the SRSs. For example, the UE 115 may refrain from tuning back to the carrier 305 after transmitting the first SRS over symbol 8 and the second SRS over symbol 10 and may instead remain tuned to the carrier 310 throughout the transmission of the SRSs. In some examples, the UE 115 may remain tuned to the carrier 310 based on a supporting a single tune per slot to transmit SRSs. In some other examples, the UE 115 may remain tuned to the carrier 310 for some duration during which the UE 115 may transmit the SRSs.

The UE 115 may then tune back to the carrier 305. For example, the UE 115 may begin tuning back to the carrier 305 at some time during symbol 12 of slot 320-b and, as a result, may suspend communications during symbol 12 of slot 320-b and during symbol 13 of slot 315.

Figure 4:
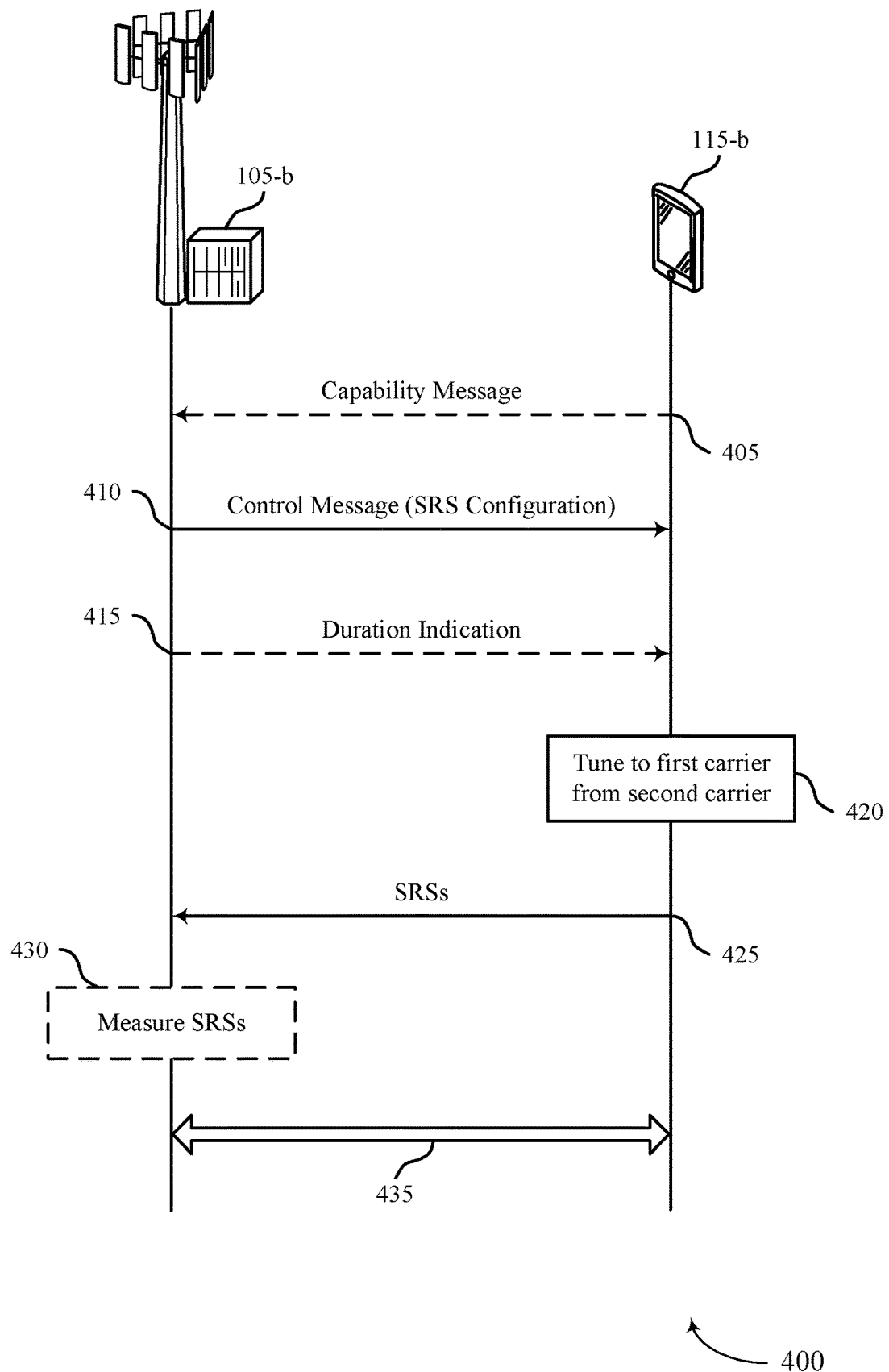
FIG. 4 illustrates an example of a process flow that supports techniques for SRS switching in accordance with aspects of the present disclosure.

FIG. 4 illustrates an example of a process flow 400 that supports techniques for SRS carrier switching in accordance with aspects of the present disclosure. In some examples, the process flow 400 may implement aspects of a wireless communications system 100 and 200 as described with reference to FIGS. 1 and 2. For example, the process flow 400 may be implemented by a base station 105-b and a UE 115-b to support carrier switching management associated with transmitting SRSs. The process flow 400 may further be implemented by the base station 105-b and the UE 115-b to provide improvements to latency, data rates, resource usage, spectral efficiency, power consumption, coordination between the base station 105-b and the UE 115-b, and processing capability, among other benefits.

The base station 105-b and the UE 115-b may be examples of a base station 105 or a UE 115, as described with reference to FIGS. 1 and 2. In the following description of the process flow 400, the operations between the base station 105-b and the UE 115-b may be communicated in a different order than the example order shown, or the operations performed by the base station 105-b and the UE 115-b may be performed in different orders or at different times. Some operations may also be omitted from the process flow 400, and other operations may be added to the process flow 400.

At 405, the UE 115-b may optionally transmit a capability message to the base station 105-b indicating that the UE 115-b supports transmitting sounding SRSs on a first carrier over multiple symbols within a slot before tuning back to a second carrier. For example, the capability message may indicate that the UE 115-b supports tuning to a different carrier once per slot to transmit one or more SRSs. Alternatively, the capability message may indicate how long the UE 115-b stays tuned to the first carrier after tuning to the first carrier or after transmitting an SRS over a temporally first symbol of the multiple symbols.

At 410, the base station 105-b may transmit a control message to the UE 115-b. The control message may include an SRS configuration that includes a resource allocation for the UE 115-b to transmit SRSs on the first carrier over multiple symbols within a slot. In some examples, the first carrier may be a downlink carrier (e.g., a carrier for downlink carrier aggregation). In some examples, the control message may trigger the transmission of the SRSs. In some other examples, the control message may configure periodic transmission of the SRSs on the first carrier.

At 415, the base station 105-b may optionally transmit a duration indication to the UE 115-b that indicates how long the UE 115-b is to stay tuned to the first carrier after tuning to the first carrier or after transmitting an SRS over a temporally first symbol of the multiple symbols.

At 420, the UE 115-*b* may tune to the first carrier from the second carrier. For example, before tuning to the first carrier, the UE 115-*b* may communicate with the base station on the second carrier. In some cases, the UE 115-*b* may not support simultaneous transmission of uplink messages on both the first carrier and the second carrier. Accordingly, to transmit the SRSs on the first carrier, the UE 115-*b* may borrow the transmission capability of the second carrier by tuning from the second carrier to the first carrier.

At 425, the UE 115-*b* may transmit the SRSs over the multiple symbols within the slot on the first carrier before tuning back to the second carrier. That is, the UE 115-*b* may remain tuned to the first carrier to transmit the SRSs over the multiple symbols. In some examples, the UE 115-*b* may remain tuned to the first carrier in accordance with the capability message (e.g., may tune to the first carrier once within the slot, may remain tuned for at least part of the duration indicated by the capability message). In some other examples, the UE 115-*b* may remain tuned to the first carrier in accordance with the duration indication. That is, the UE 115-*b* may remain tuned to the first carrier for the duration indicated by the duration indication before tuning back to the second carrier.

At 430, the base station 105-*b* may measure the SRSs transmitted by the UE to obtain CSI associated with the first carrier. For example, the base station 105-*b* may perform channel estimation procedures associated with the first carrier using the SRSs.

At 435, the UE 115-*b* and the base station 105-*b* may communicate based on the SRSs. For example, the base station 105-*b* may select one or more downlink beams based on the SRS measurements and may transmit downlink messages to the UE 115-*b* using the selected downlink beams.

Figure 5:
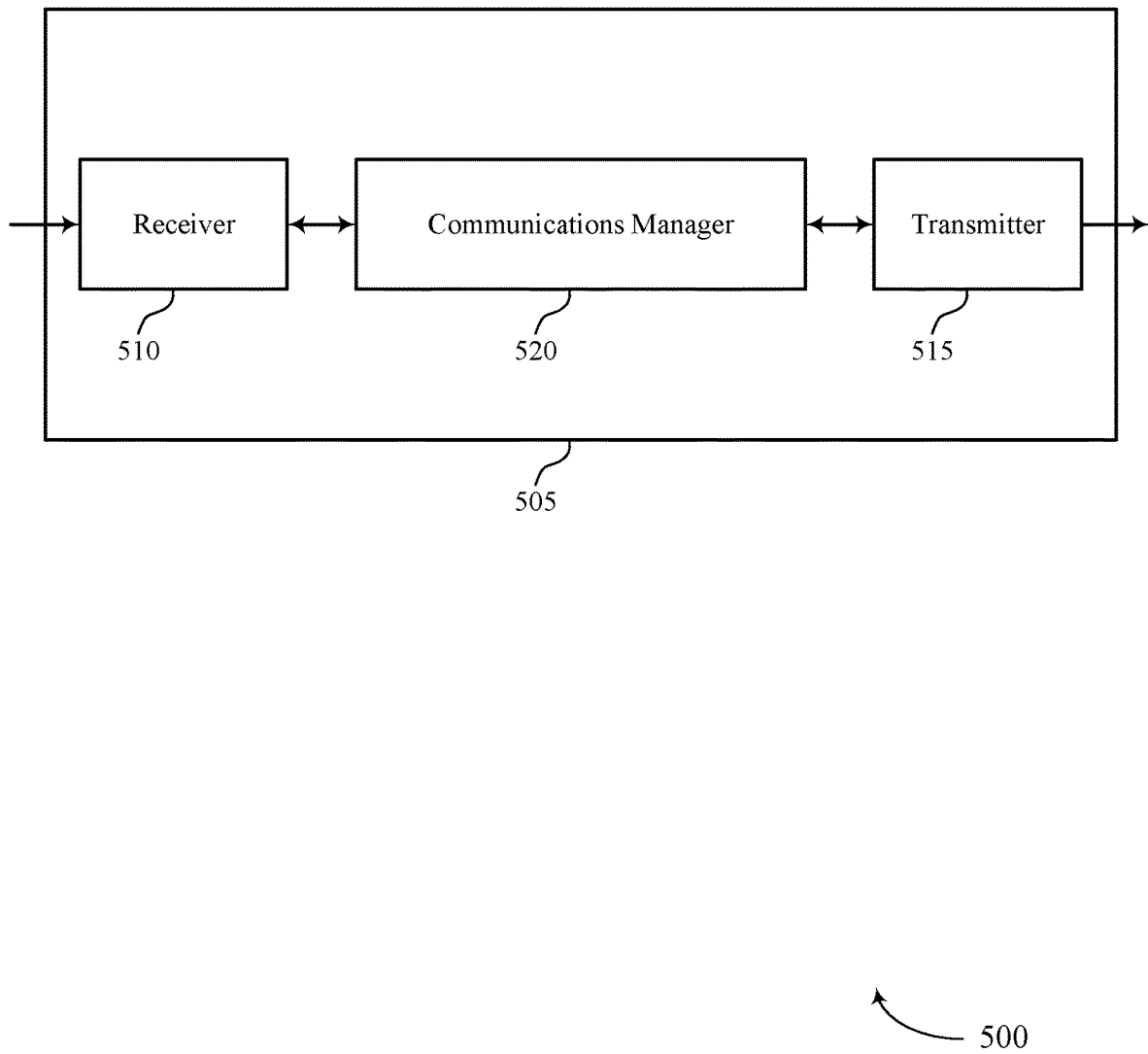
FIGS. 5 and 6 show block diagrams of devices that support techniques for SRS carrier switching in accordance with aspects of the present disclosure.

FIG. 5 shows a block diagram 500 of a device 505 that supports techniques for SRS carrier switching in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for SRS carrier switching). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for SRS carrier switching). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for SRS carrier switching as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a control message that indicates an SRS configuration for the UE to transmit SRSs on a first carrier over multiple symbols within a slot, where the first carrier is different from a second carrier on which the UE communicates with a base station during the slot. The communications manager 520 may be configured as or otherwise support a means for tuning to the first carrier based on the control message and in accordance with the control message. The communications manager 520 may be configured as or otherwise support a means for transmitting the SRSs over the multiple symbols within the slot on the first carrier before tuning back to the second carrier.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources by managing the tuning between carriers to transmit SRSs over multiple symbols within a slot.

Figure 6:
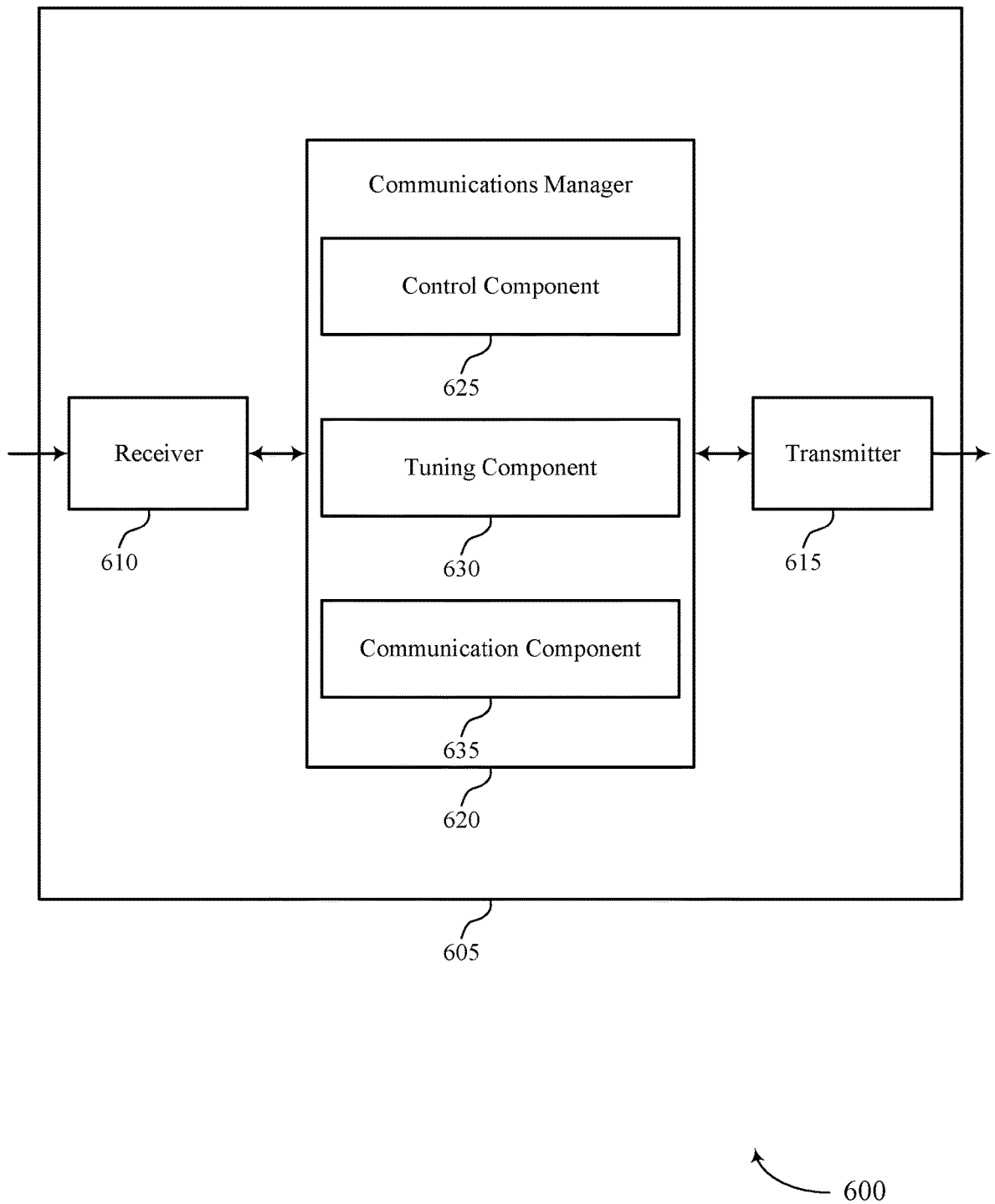

FIG. 6 shows a block diagram 600 of a device 605 that supports techniques for SRS carrier switching in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for SRS carrier switching). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for SRS carrier switching). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for SRS carrier switching as described herein. For example, the communications manager 620 may include a control component 625, a tuning component 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control component 625 may be configured as or otherwise support a means for receiving a control message that indicates an SRS configuration for the UE to transmit SRSs on a first carrier over multiple symbols within a slot, where the first carrier is different from a second carrier on which the UE communicates with a base station during the slot. The tuning component 630 may be configured as or otherwise support a means for tuning to the first carrier based on the control message and in accordance with the control message. The communication component 635 may be configured as or otherwise support a means for transmitting the SRSs over the multiple symbols within the slot on the first carrier before tuning back to the second carrier.

Figure 7:
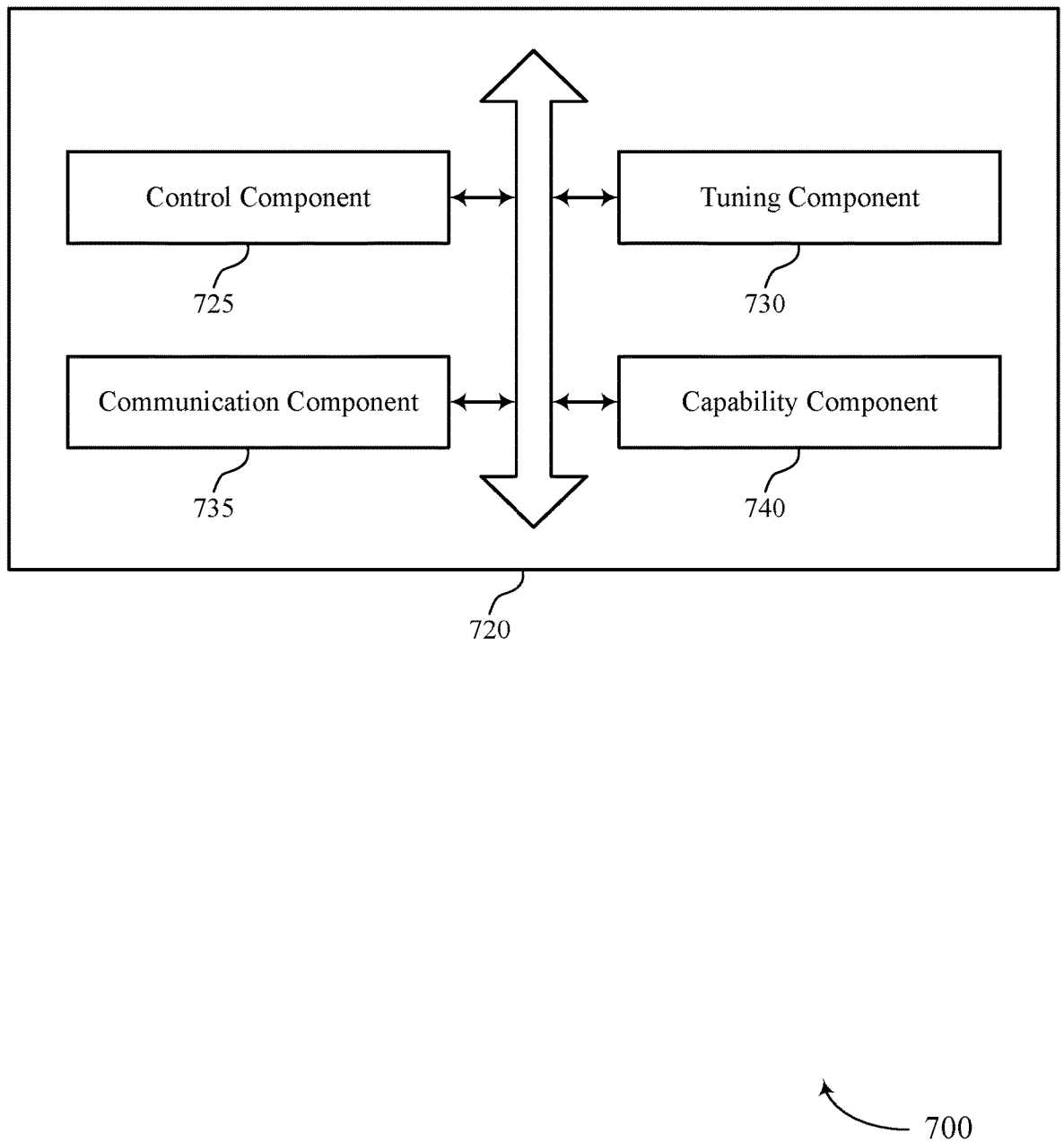
FIG. 7 shows a block diagram of a communications manager that supports techniques for SRS carrier switching in accordance with aspects of the present disclosure.

FIG. 7 shows a block diagram 700 of a communications manager 720 that supports techniques for SRS carrier switching in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for SRS carrier switching as described herein. For example, the communications manager 720 may include a control component 725, a tuning component 730, a communication component 735, a capability component 740, or any combination thereof. Each of these components may communicate, directly or indirectly, with one another (e.g., via one or more buses).

The communications manager 720 may support wireless communication at a UE in accordance with examples as disclosed herein. The control component 725 may be configured as or otherwise support a means for receiving a control message that indicates an SRS configuration for the UE to transmit SRSs on a first carrier over multiple symbols within a slot, where the first carrier is different from a second carrier on which the UE communicates with a base station during the slot. The tuning component 730 may be configured as or otherwise support a means for tuning to the first carrier based on the control message and in accordance with the control message. The communication component 735 may be configured as or otherwise support a means for transmitting the SRSs over the multiple symbols within the slot on the first carrier before tuning back to the second carrier.

In some examples, the capability component 740 may be configured as or otherwise support a means for transmitting a capability message indicating that the UE supports tuning to a different carrier once per slot to transmit one or more SRSs, where transmitting the SRSs over the multiple symbols within the slot on the first carrier before tuning back to the second carrier is in accordance with the capability message.

In some examples, the capability component 740 may be configured as or otherwise support a means for transmitting a capability message indicating a duration for which the UE remains tuned to the first carrier after tuning to the first carrier, where transmitting the SRSs over the multiple symbols within the slot on the first carrier before tuning back to the second carrier is in accordance with the capability message.

In some examples, the tuning component 730 may be configured as or otherwise support a means for determining that the UE completes transmission of the SRSs over the multiple symbols. In some examples, the tuning component 730 may be configured as or otherwise support a means for tuning back to the second carrier before the duration expires based on the determining.

In some examples, the duration is specific to a RAT supported by the UE.

In some examples, the capability message further indicates a second duration for which the UE remains tuned to the first carrier after tuning to the first carrier, the second duration specific to a second RAT supported by the UE.

In some examples, the tuning component 730 may be configured as or otherwise support a means for receiving, from the base station, an indication of a duration for which the UE is to remain tuned to the first carrier after tuning to the first carrier, where transmitting the SRSs over the multiple symbols within the slot on the first carrier before tuning back to the second carrier is in accordance with the indication of the duration.

In some examples, receiving the indication of the duration includes receiving the indication of the duration in the SRS configuration.

In some examples, a duration for which the UE remains tuned to the first carrier after tuning to the first carrier includes one or more of a first duration specific to a first RAT, a second duration specific to a second RAT, or both.

In some examples, the multiple symbols within the slot are discontinuous symbols.

In some examples, at least two symbols of the multiple symbols within the slot are continuous symbols.

In some examples, the SRS configuration includes an allocation of resources for transmitting the SRSs on the first carrier over the multiple symbols.

In some examples, the first carrier is configured for downlink carrier aggregation.

Figure 8:
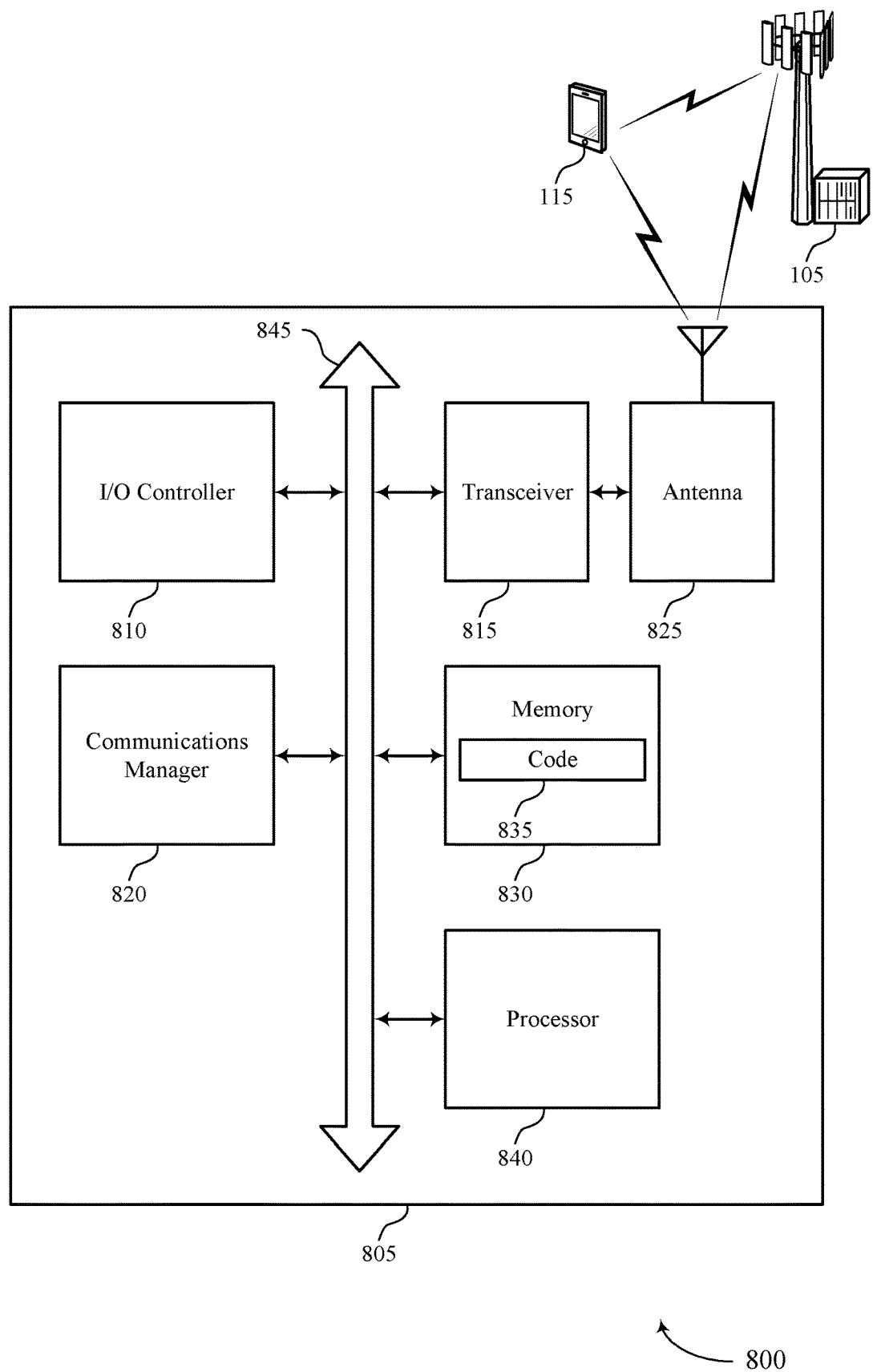
FIG. 8 shows a diagram of a system including a device that supports techniques for SRS carrier switching in accordance with aspects of the present disclosure.

FIG. 8 shows a diagram of a system 800 including a device 805 that supports techniques for SRS carrier switching in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for SRS carrier switching). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a control message that indicates an SRS configuration for the UE to transmit SRSs on a first carrier over multiple symbols within a slot, where the first carrier is different from a second carrier on which the UE communicates with a base station during the slot. The communications manager 820 may be configured as or otherwise support a means for tuning to the first carrier based on the control message and in accordance with the control message. The communications manager 820 may be configured as or otherwise support a means for transmitting the SRSs over the multiple symbols within the slot on the first carrier before tuning back to the second carrier.

By including or configuring the communications manager 820 in accordance with examples as described herein, the device 805 may support techniques for improved data rates, spectral efficiency, latency, power consumption, resource usage, coordination between devices, battery life, and processing capability, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for SRS carrier switching as described herein, or the processor 840 and the memory 830 may be otherwise configured to perform or support such operations.

Figure 9:
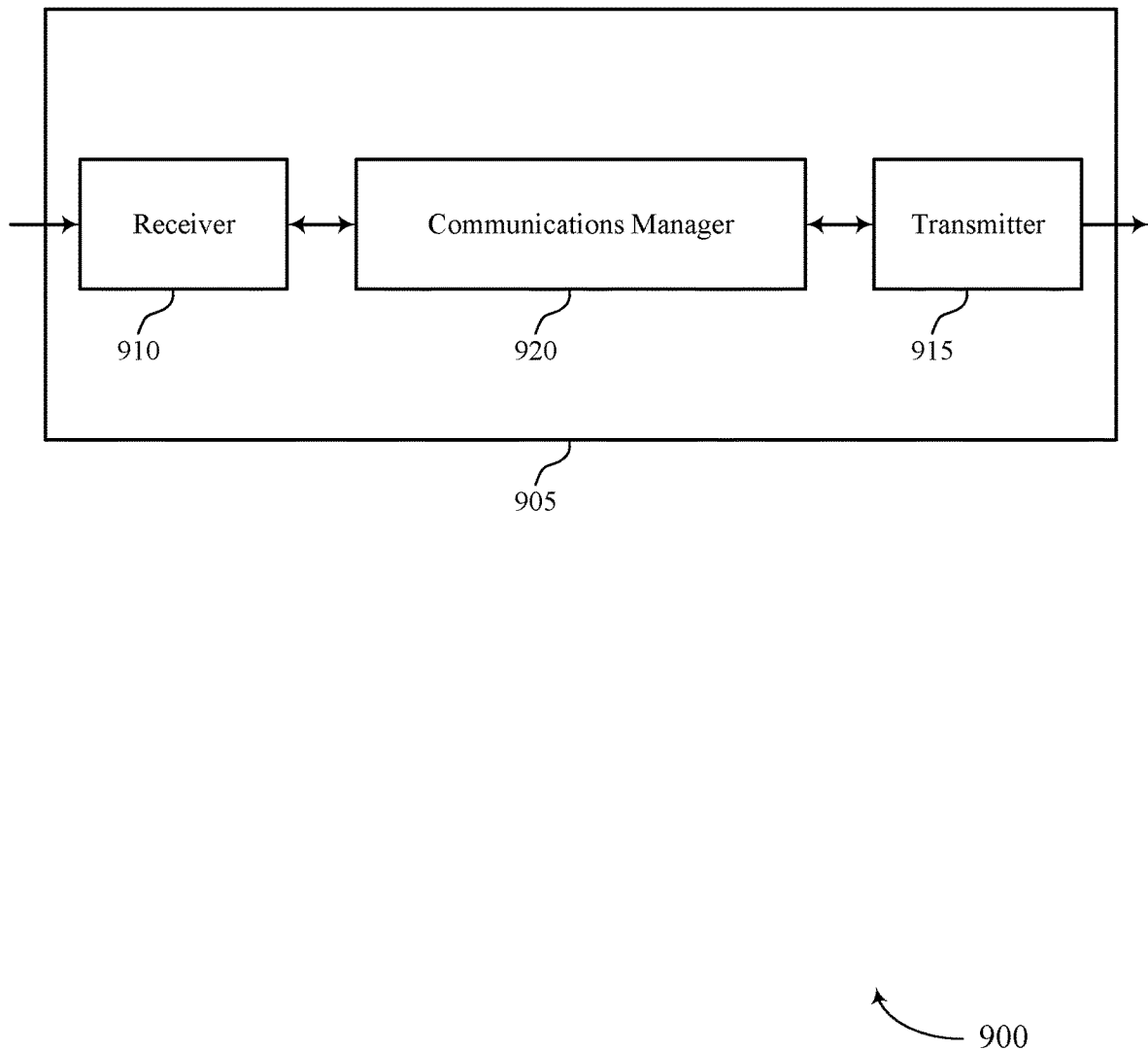
FIGS. 9 and 10 show block diagrams of devices that support techniques for SRS carrier switching in accordance with aspects of the present disclosure.

FIG. 9 shows a block diagram 900 of a device 905 that supports techniques for SRS carrier switching in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for SRS carrier switching). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for SRS carrier switching). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for SRS carrier switching as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a UE, a capability message indicating that the UE supports transmitting SRSs on a first carrier over multiple symbols within a slot before tuning back to a second carrier different from the first carrier on which the base station communicates with the UE during the slot. The communications manager 920 may be configured as or otherwise support a means for transmitting, to the UE, a control message that indicates an SRS configuration for the UE to transmit the SRSs on the first carrier over the multiple symbols within the slot. The communications manager 920 may be configured as or otherwise support a means for receiving the SRSs over the multiple symbols within the slot on the first carrier in accordance with the capability message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources by supporting carrier switching management associated with transmitting SRSs over multiple symbols within a slot.

Figure 10:
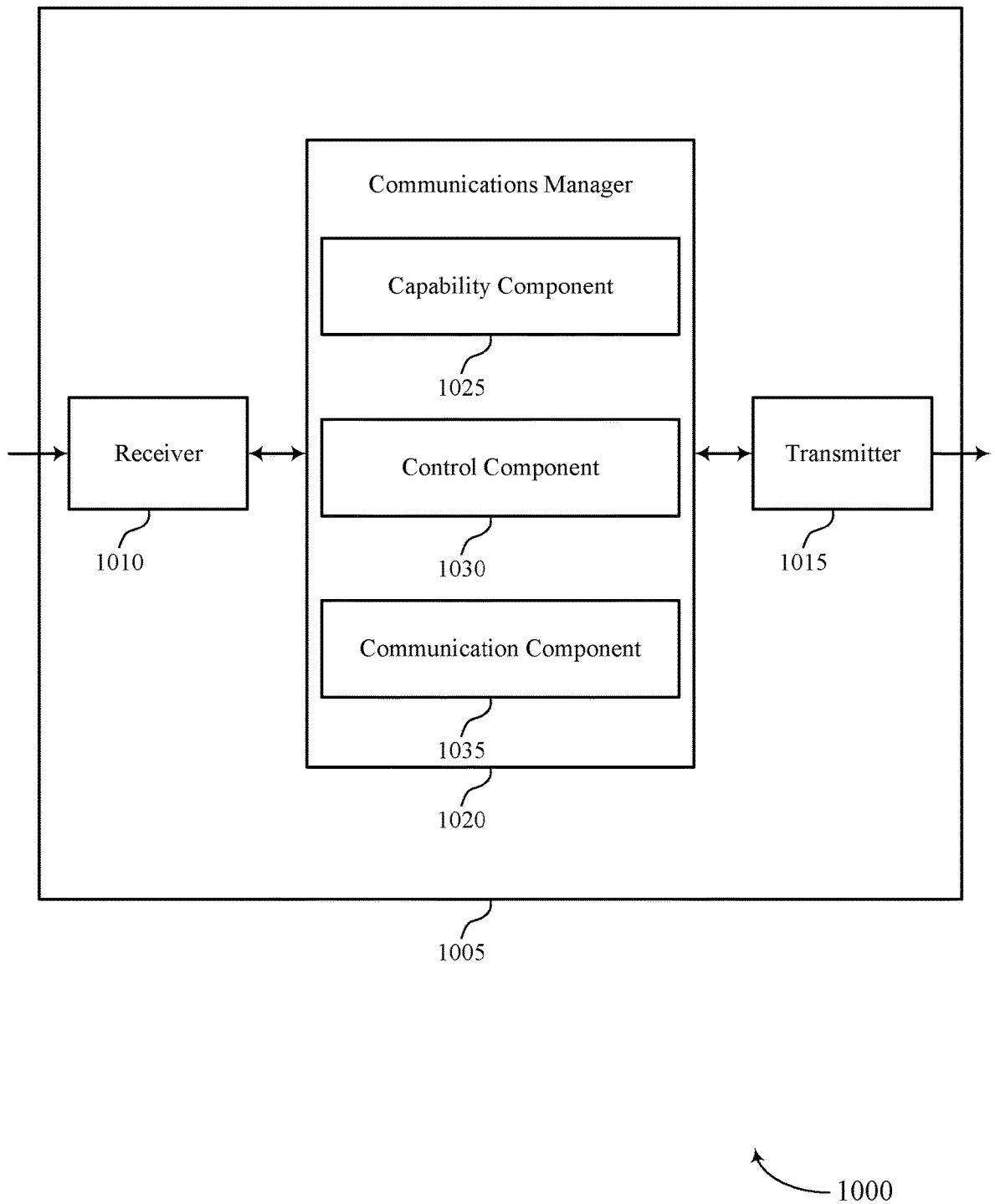

FIG. 10 shows a block diagram 1000 of a device 1005 that supports techniques for SRS carrier switching in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for SRS carrier switching). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for SRS carrier switching). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for SRS carrier switching as described herein. For example, the communications manager 1020 may include a capability component 1025, a control component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The capability component 1025 may be configured as or otherwise support a means for receiving, from a UE, a capability message indicating that the UE supports transmitting SRSs on a first carrier over multiple symbols within a slot before tuning back to a second carrier different from the first carrier on which the base station communicates with the UE during the slot. The control component 1030 may be configured as or otherwise support a means for transmitting, to the UE, a control message that indicates an SRS configuration for the UE to transmit the SRSs on the first carrier over the multiple symbols within the slot. The communication component 1035 may be configured as or otherwise support a means for receiving the SRSs over the multiple symbols within the slot on the first carrier in accordance with the capability message.

Figure 11:
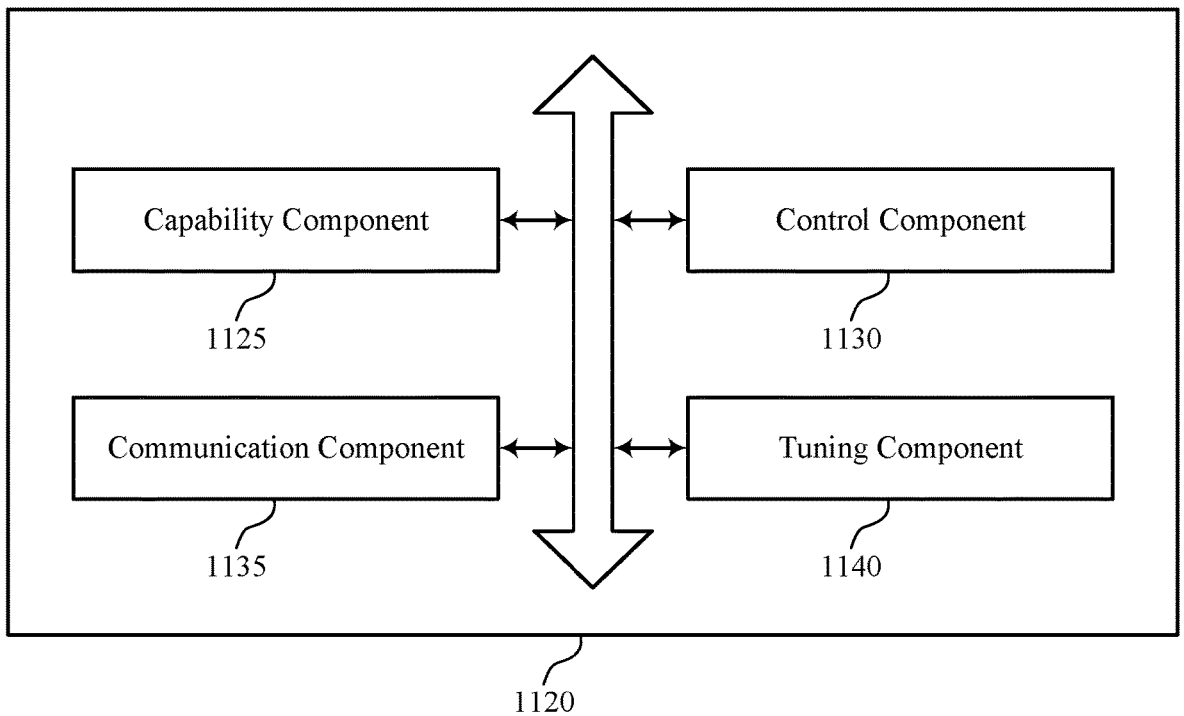
FIG. 11 shows a block diagram of a communications manager that supports techniques for SRS carrier switching in accordance with aspects of the present disclosure.

FIG. 11 shows a block diagram 1100 of a communications manager 1120 that supports techniques for SRS carrier switching in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for SRS carrier switching as described herein. For example, the communications manager 1120 may include a capability component 1125, a control component 1130, a communication component 1135, a tuning component 1140, or any combination thereof. Each of these components may communicate, directly or indirectly, with one another (e.g., via one or more buses).

The communications manager 1120 may support wireless communication at a base station in accordance with examples as disclosed herein. The capability component 1125 may be configured as or otherwise support a means for receiving, from a UE, a capability message indicating that the UE supports transmitting SRSs on a first carrier over multiple symbols within a slot before tuning back to a second carrier different from the first carrier on which the base station communicates with the UE during the slot. The control component 1130 may be configured as or otherwise support a means for transmitting, to the UE, a control message that indicates an SRS configuration for the UE to transmit the SRSs on the first carrier over the multiple symbols within the slot. The communication component 1135 may be configured as or otherwise support a means for receiving the SRSs over the multiple symbols within the slot on the first carrier in accordance with the capability message.

In some examples, the capability message indicates that the UE supports tuning to a different carrier once per slot to transmit one or more SRSs.

In some examples, the capability message indicates a duration for which the UE remains tuned to the first carrier after tuning to the first carrier.

In some examples, the duration includes one or more of a first duration specific to a first RAT, a second duration specific to a second RAT, or both.

In some examples, the tuning component 1140 may be configured as or otherwise support a means for transmitting, to the UE, an indication of a duration for which the UE is to remain tuned to the first carrier after tuning to the first carrier, where receiving the SRSs over the multiple symbols within the slot on the first carrier is in accordance with the indication of the duration.

In some examples, the duration includes one or more of a first duration specific to a first RAT, a second duration specific to a second RAT, or both.

In some examples, transmitting the indication of the duration includes transmitting the indication of the duration in the SRS configuration.

In some examples, the multiple symbols within the slot are discontinuous symbols.

In some examples, at least two symbols of the multiple symbols within the slot are continuous symbols.

In some examples, the SRS configuration includes an allocation of resources for transmitting the SRSs on the first carrier over the multiple symbols.

In some examples, the first carrier is configured for downlink carrier aggregation.

Figure 12:
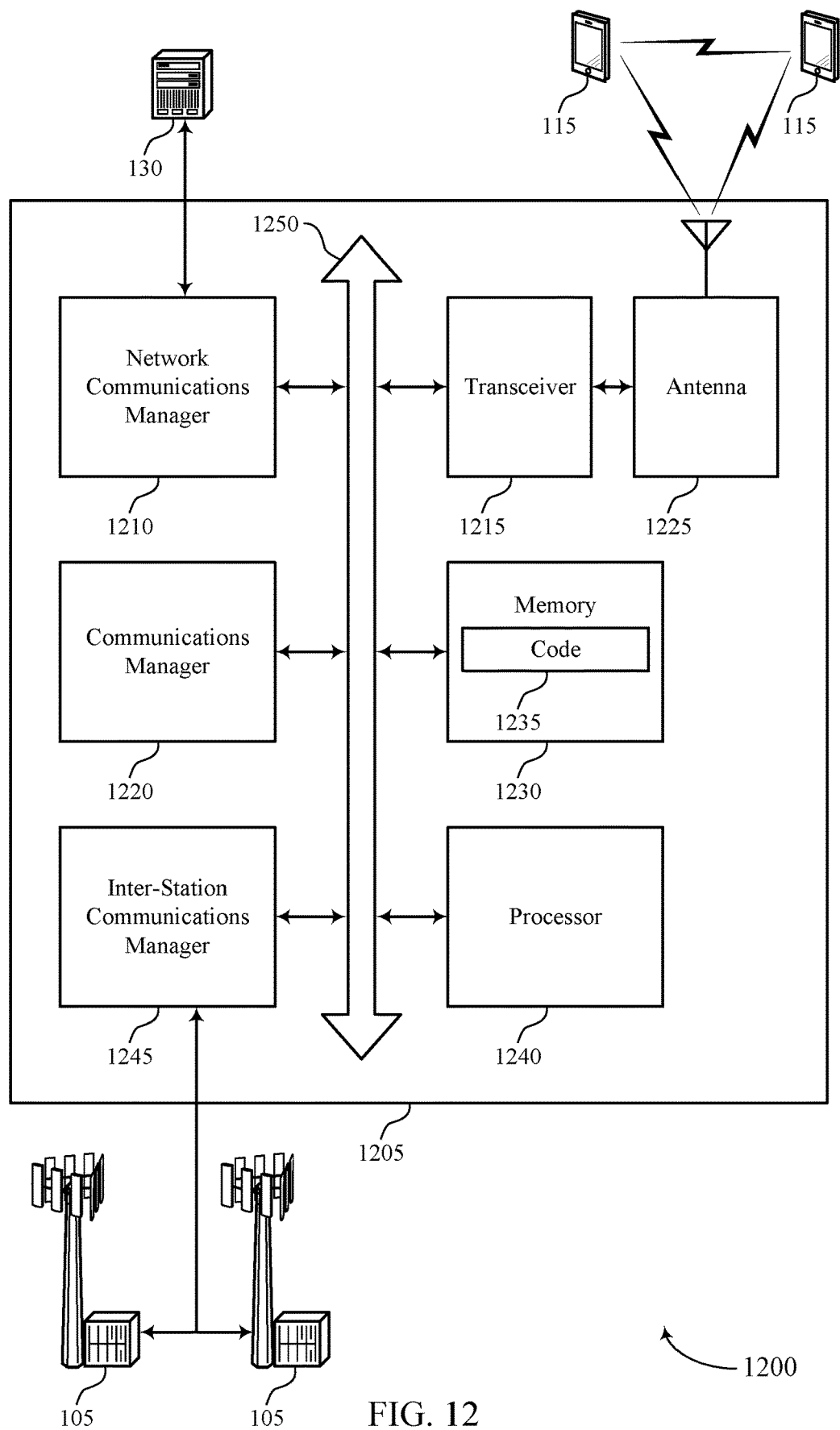
FIG. 12 shows a diagram of a system including a device that supports techniques for SRS carrier switching in accordance with aspects of the present disclosure.

FIG. 12 shows a diagram of a system 1200 including a device 1205 that supports techniques for SRS carrier switching in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for SRS carrier switching). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a UE, a capability message indicating that the UE supports transmitting SRSs on a first carrier over multiple symbols within a slot before tuning back to a second carrier different from the first carrier on which the base station communicates with the UE during the slot. The communications manager 1220 may be configured as or otherwise support a means for transmitting, to the UE, a control message that indicates an SRS configuration for the UE to transmit the SRSs on the first carrier over the multiple symbols within the slot. The communications manager 1220 may be configured as or otherwise support a means for receiving the SRSs over the multiple symbols within the slot on the first carrier in accordance with the capability message.

By including or configuring the communications manager 1220 in accordance with examples as described herein, the device 1205 may support techniques for improved data rates, spectral efficiency, latency, power consumption, resource usage, coordination between devices, battery life, and processing capability, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for SRS carrier switching as described herein, or the processor 1240 and the memory 1230 may be otherwise configured to perform or support such operations.

Figure 13:
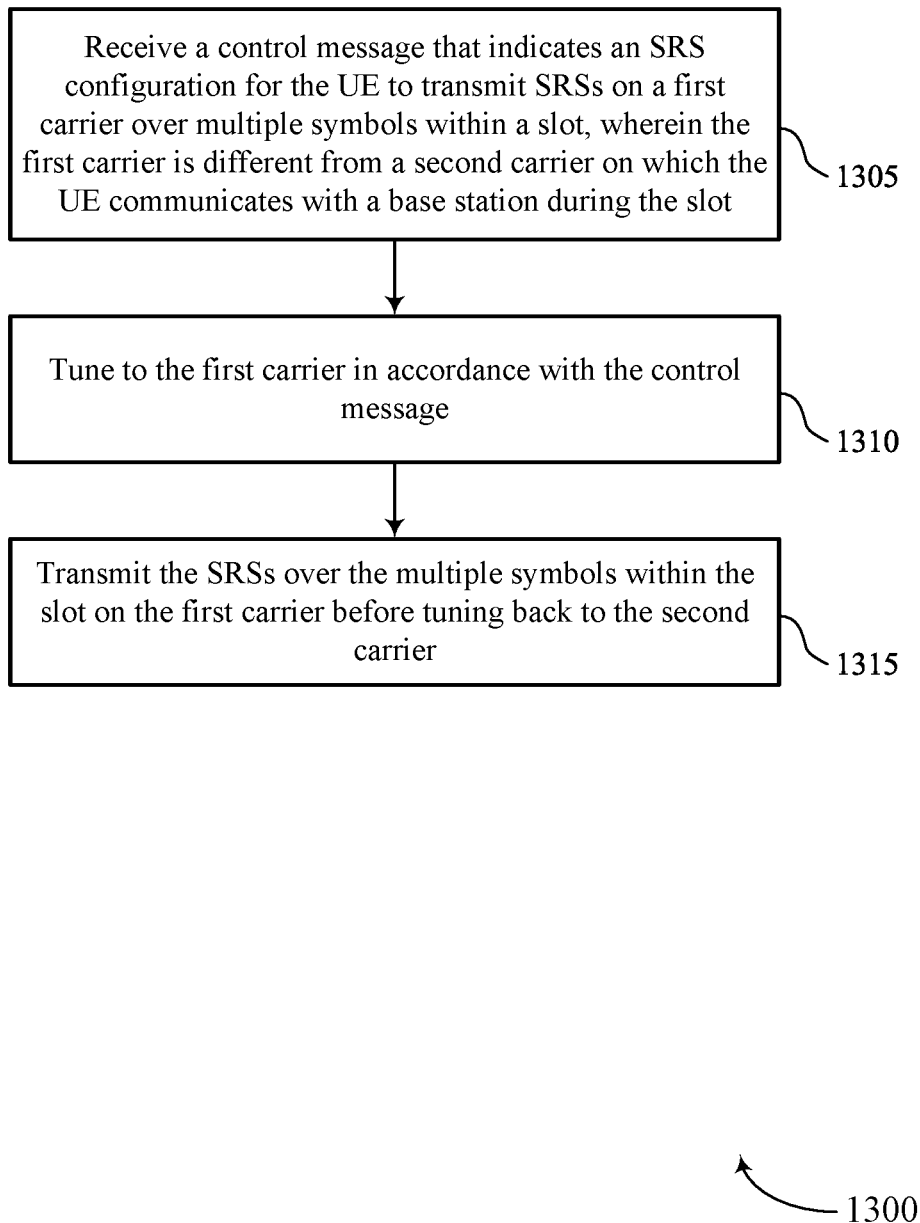
FIGS. 13 through 18 show flowcharts illustrating methods that support techniques for SRS carrier switching in accordance with aspects of the present disclosure.

FIG. 13 shows a flowchart illustrating a method 1300 that supports techniques for SRS carrier switching in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a control message that indicates an SRS configuration for the UE to transmit SRSs on a first carrier over multiple symbols within a slot, wherein the first carrier is different from a second carrier on which the UE communicates with a base station during the slot. The operations of 1305 may be performed in accordance with examples as disclosed herein. In some examples, aspects of the operations of 1305 may be performed by a control component 725 as described with reference to FIG. 7.

At 1310, the method may include tuning to the first carrier in accordance with the control message. The operations of 1310 may be performed in accordance with examples as disclosed herein. In some examples, aspects of the operations of 1310 may be performed by a tuning component 730 as described with reference to FIG. 7.

At 1315, the method may include transmitting the SRSs over the multiple symbols within the slot on the first carrier before tuning back to the second carrier. The operations of 1315 may be performed in accordance with examples as disclosed herein. In some examples, aspects of the operations of 1315 may be performed by a communication component 735 as described with reference to FIG. 7.

Figure 14:
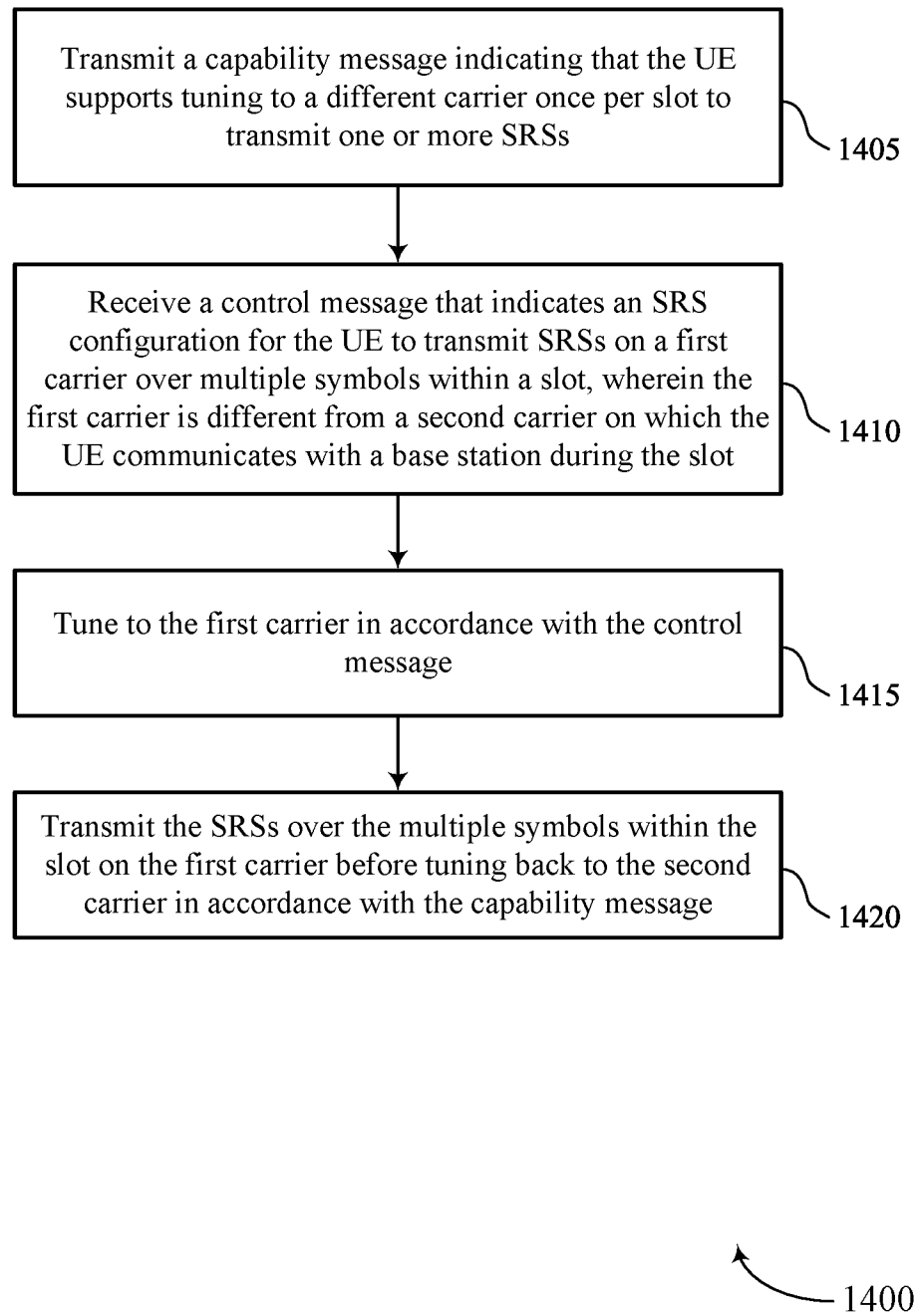

FIG. 14 shows a flowchart illustrating a method 1400 that supports techniques for SRS carrier switching in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting a capability message indicating that the UE supports tuning to a different carrier once per slot to transmit one or more SRSs. The operations of 1405 may be performed in accordance with examples as disclosed herein. In some examples, aspects of the operations of 1405 may be performed by a capability component 740 as described with reference to FIG. 7.

At 1410, the method may include receiving a control message that indicates an SRS configuration for the UE to transmit SRSs on a first carrier over multiple symbols within a slot, wherein the first carrier is different from a second carrier on which the UE communicates with a base station during the slot. The operations of 1410 may be performed in accordance with examples as disclosed herein. In some examples, aspects of the operations of 1410 may be performed by a control component 725 as described with reference to FIG. 7.

At 1415, the method may include tuning to the first carrier in accordance with the control message. The operations of 1415 may be performed in accordance with examples as disclosed herein. In some examples, aspects of the operations of 1415 may be performed by a tuning component 730 as described with reference to FIG. 7.

At 1420, the method may include transmitting the SRSs over the multiple symbols within the slot on the first carrier before tuning back to the second carrier in accordance with the capability message. The operations of 1420 may be performed in accordance with examples as disclosed herein. In some examples, aspects of the operations of 1420 may be performed by a communication component 735 as described with reference to FIG. 7.

Figure 15:
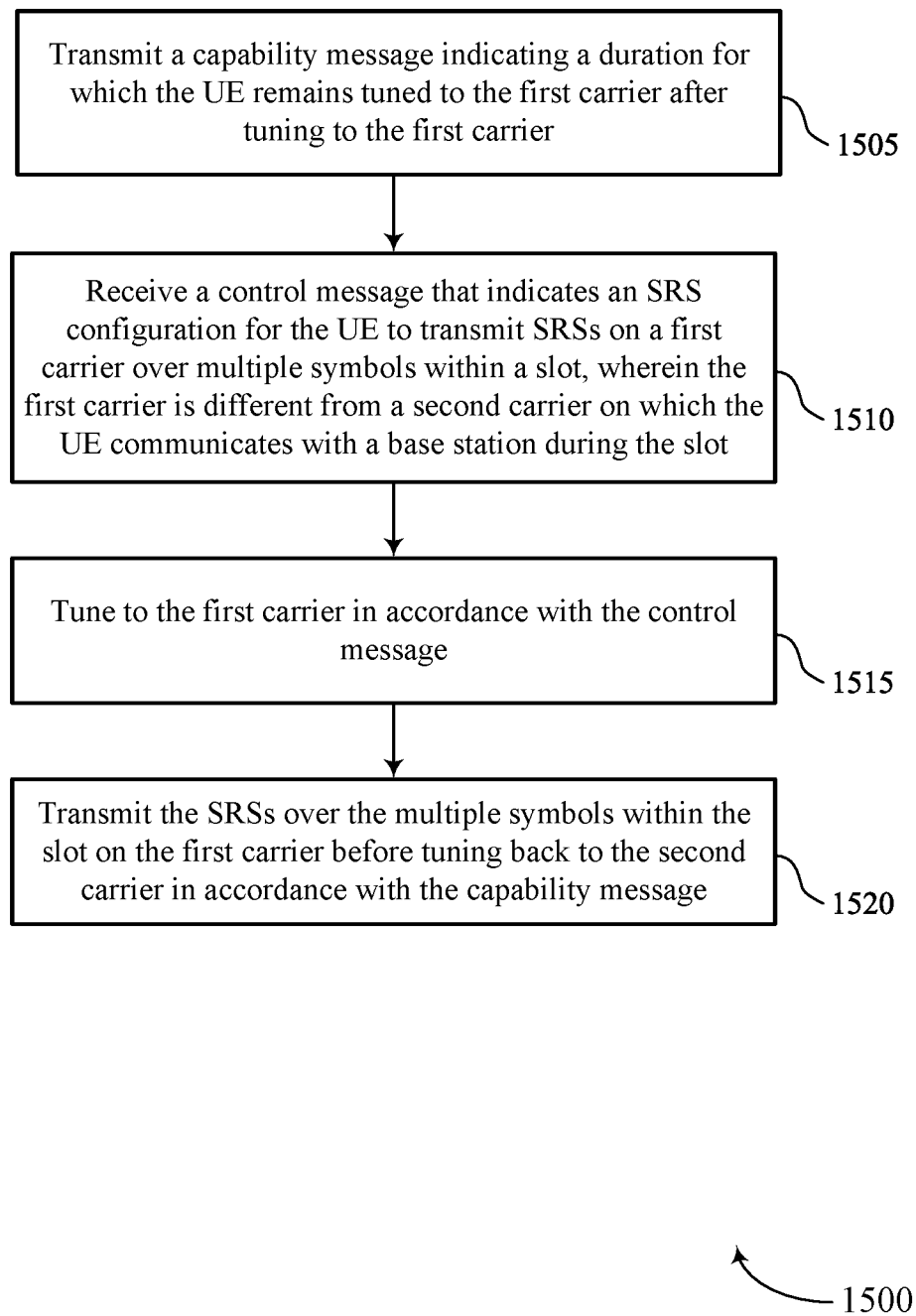

FIG. 15 shows a flowchart illustrating a method 1500 that supports techniques for SRS carrier switching in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting a capability message indicating a duration for which the UE remains tuned to the first carrier after tuning to the first carrier. The operations of 1505 may be performed in accordance with examples as disclosed herein. In some examples, aspects of the operations of 1505 may be performed by a capability component 740 as described with reference to FIG. 7.

At 1510, the method may include receiving a control message that indicates an SRS configuration for the UE to transmit SRSs on a first carrier over multiple symbols within a slot, wherein the first carrier is different from a second carrier on which the UE communicates with a base station during the slot. The operations of 1510 may be performed in accordance with examples as disclosed herein. In some examples, aspects of the operations of 1510 may be performed by a control component 725 as described with reference to FIG. 7.

At 1515, the method may include tuning to the first carrier in accordance with the control message. The operations of 1515 may be performed in accordance with examples as disclosed herein. In some examples, aspects of the operations of 1515 may be performed by a tuning component 730 as described with reference to FIG. 7.

At 1520, the method may include transmitting the SRSs over the multiple symbols within the slot on the first carrier before tuning back to the second carrier in accordance with the capability message. The operations of 1520 may be performed in accordance with examples as disclosed herein.

In some examples, aspects of the operations of 1520 may be performed by a communication component 735 as described with reference to FIG. 7.

Figure 16:
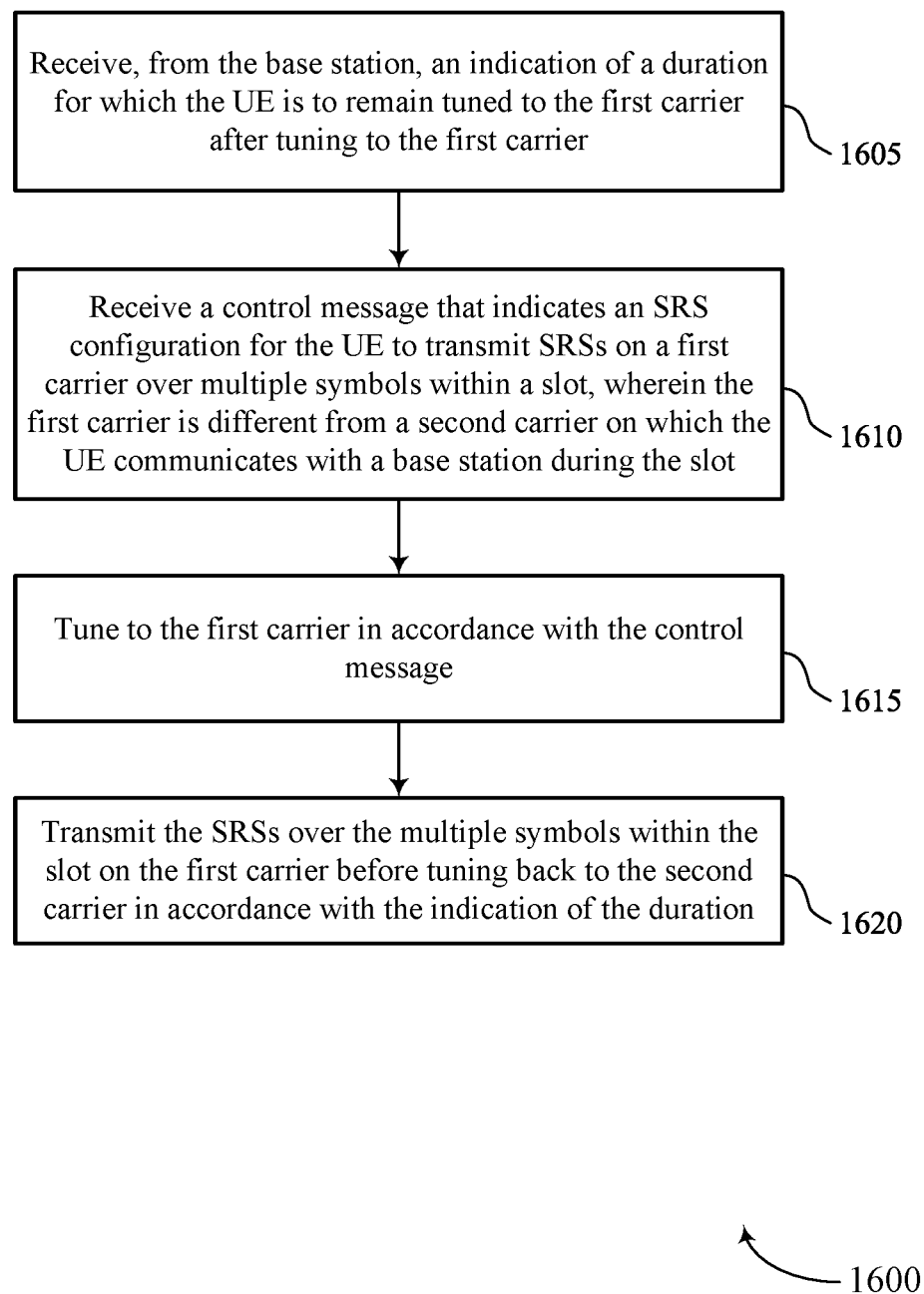

FIG. 16 shows a flowchart illustrating a method 1600 that supports techniques for SRS carrier switching in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from the base station, an indication of a duration for which the UE is to remain tuned to the first carrier after tuning to the first carrier. The operations of 1605 may be performed in accordance with examples as disclosed herein. In some examples, aspects of the operations of 1605 may be performed by a tuning component 730 as described with reference to FIG. 7.

At 1610, the method may include receiving a control message that indicates an SRS configuration for the UE to transmit SRSs on a first carrier over multiple symbols within a slot, wherein the first carrier is different from a second carrier on which the UE communicates with a base station during the slot. The operations of 1610 may be performed in accordance with examples as disclosed herein. In some examples, aspects of the operations of 1610 may be performed by a control component 725 as described with reference to FIG. 7.

At 1615, the method may include tuning to the first carrier in accordance with the control message. The operations of 1615 may be performed in accordance with examples as disclosed herein. In some examples, aspects of the operations of 1615 may be performed by a tuning component 730 as described with reference to FIG. 7.

At 1620, the method may include transmitting the SRSs over the multiple symbols within the slot on the first carrier before tuning back to the second carrier in accordance with the indication of the duration. The operations of 1620 may be performed in accordance with examples as disclosed herein. In some examples, aspects of the operations of 1620 may be performed by a communication component 735 as described with reference to FIG. 7.

Figure 17:
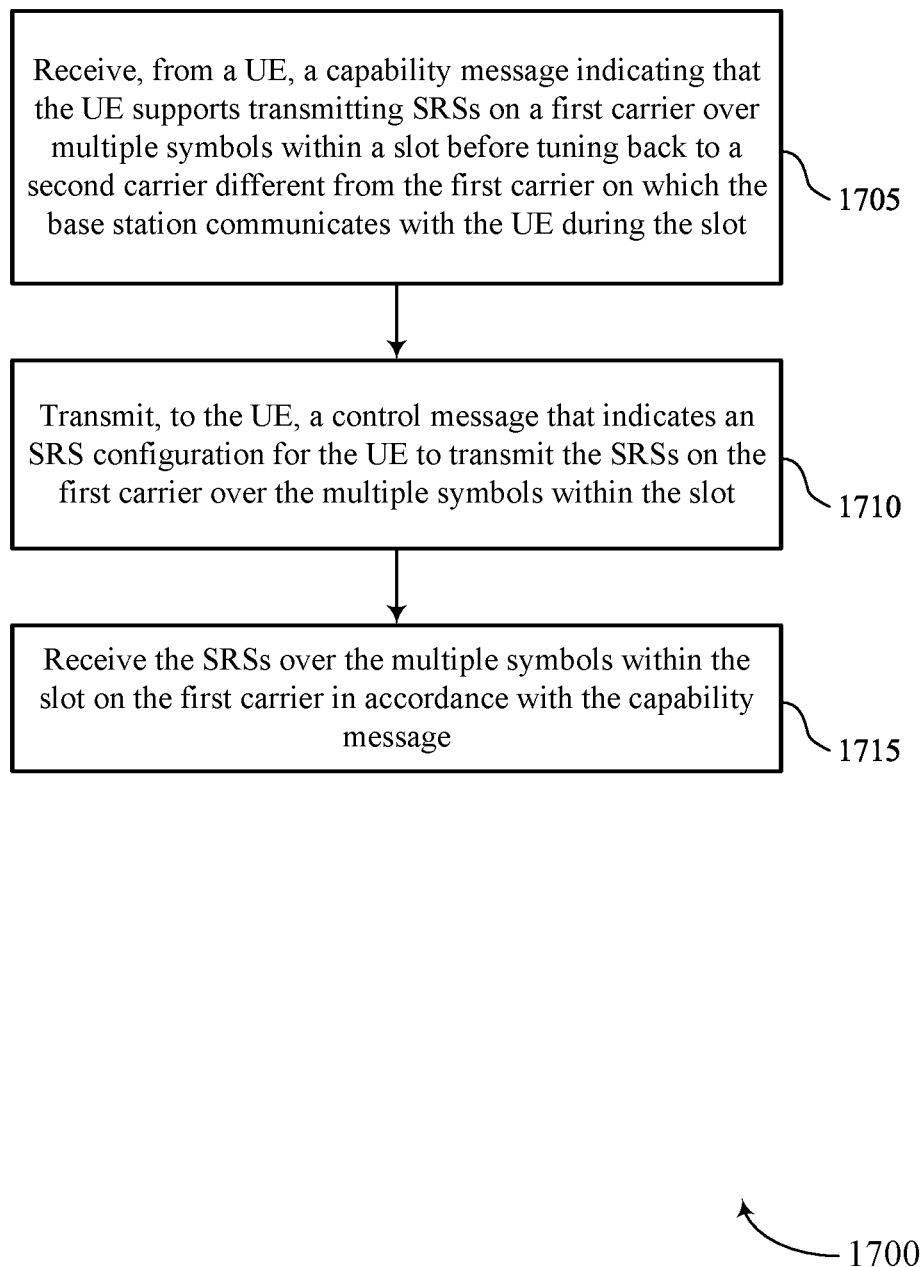

FIG. 17 shows a flowchart illustrating a method 1700 that supports techniques for SRS carrier switching in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a capability message indicating that the UE supports transmitting SRSs on a first carrier over multiple symbols within a slot before tuning back to a second carrier different from the first carrier on which the base station communicates with the UE during the slot. The operations of 1705 may be performed in accordance with examples as disclosed herein. In some examples, aspects of the operations of 1705 may be performed by a capability component 1125 as described with reference to FIG. 11.

At 1710, the method may include transmitting, to the UE, a control message that indicates an SRS configuration for the UE to transmit the SRSs on the first carrier over the multiple symbols within the slot. The operations of 1710 may be performed in accordance with examples as disclosed herein. In some examples, aspects of the operations of 1710 may be performed by a control component 1130 as described with reference to FIG. 11.

At 1715, the method may include receiving the SRSs over the multiple symbols within the slot on the first carrier in accordance with the capability message. The operations of 1715 may be performed in accordance with examples as disclosed herein. In some examples, aspects of the operations of 1715 may be performed by a communication component 1135 as described with reference to FIG. 11.

Figure 18:
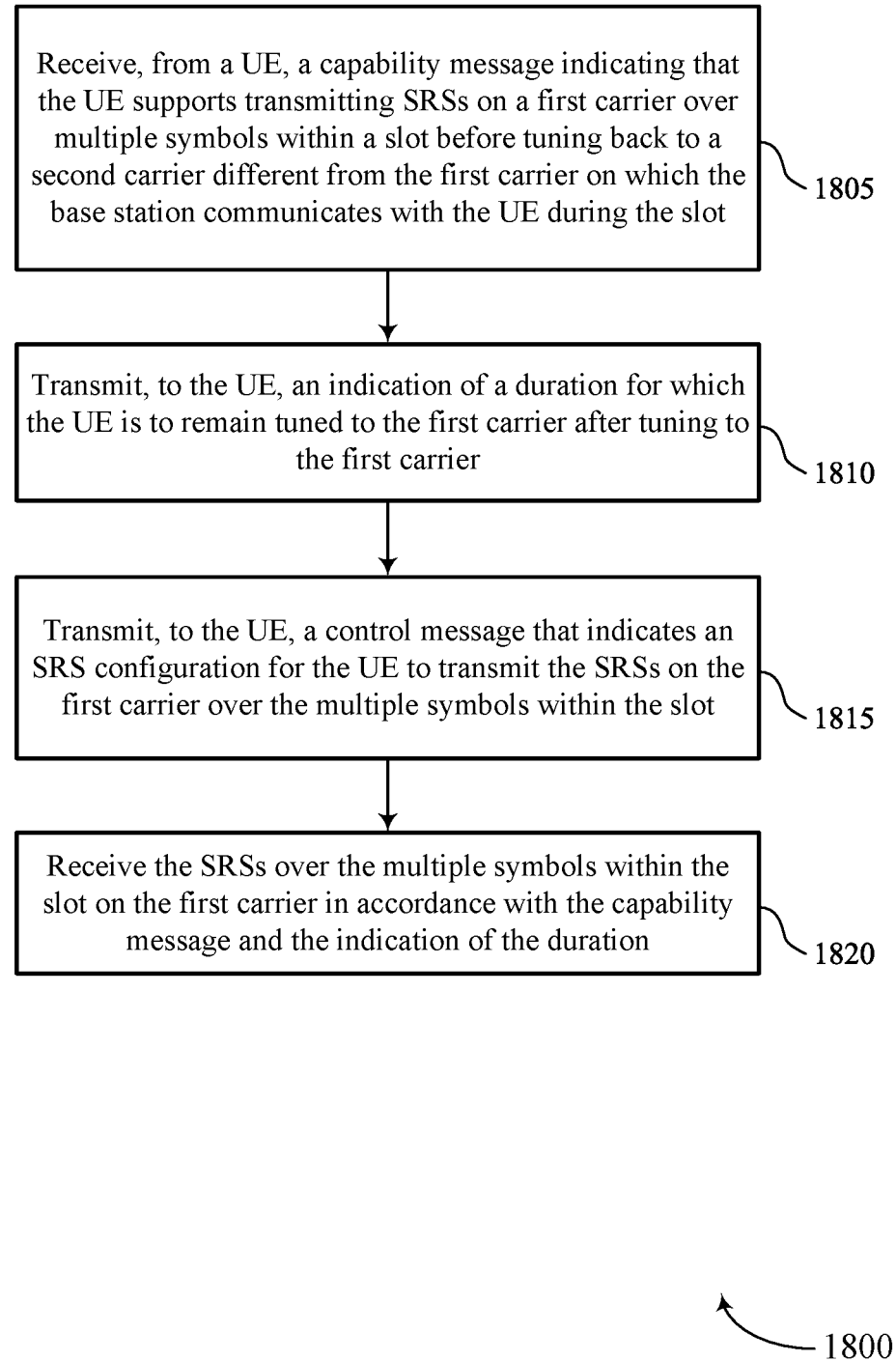

FIG. 18 shows a flowchart illustrating a method 1800 that supports techniques for SRS carrier switching in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a capability message indicating that the UE supports transmitting SRSs on a first carrier over multiple symbols within a slot before tuning back to a second carrier different from the first carrier on which the base station communicates with the UE during the slot. The operations of 1805 may be performed in accordance with examples as disclosed herein. In some examples, aspects of the operations of 1805 may be performed by a capability component 1125 as described with reference to FIG. 11.

At 1810, the method may include transmitting, to the UE, an indication of a duration for which the UE is to remain tuned to the first carrier after tuning to the first carrier. The operations of 1810 may be performed in accordance with examples as disclosed herein. In some examples, aspects of the operations of 1810 may be performed by a tuning component 1140 as described with reference to FIG. 11.

At 1815, the method may include transmitting, to the UE, a control message that indicates an SRS configuration for the UE to transmit the SRSs on the first carrier over the multiple symbols within the slot. The operations of 1815 may be performed in accordance with examples as disclosed herein. In some examples, aspects of the operations of 1815 may be performed by a control component 1130 as described with reference to FIG. 11.

At 1820, the method may include receiving the SRSs over the multiple symbols within the slot on the first carrier in accordance with the capability message and the indication of the duration. The operations of 1820 may be performed in accordance with examples as disclosed herein. In some examples, aspects of the operations of 1820 may be performed by a communication component 1135 as described with reference to FIG. 11.

The following provides an overview of aspects of the present disclosure:

Aspect 1: A method for wireless communication at a UE, comprising: receiving a control message that indicates an SRS configuration for the UE to transmit SRSs on a first carrier over multiple symbols within a slot, wherein the first carrier is different from a second carrier on which the UE communicates with a base station during the slot; tuning to the first carrier in accordance with the control message; and transmitting the SRSs over the multiple symbols within the slot on the first carrier before tuning back to the second carrier.

Aspect 2: The method of aspect 1, further comprising: transmitting a capability message indicating that the UE supports tuning to a different carrier once per slot to transmit one or more SRSs, wherein transmitting the SRSs over the multiple symbols within the slot on the first carrier before tuning back to the second carrier is in accordance with the capability message.

Aspect 3: The method of any of aspects 1 through 2, further comprising: transmitting a capability message indicating a duration for which the UE remains tuned to the first carrier after tuning to the first carrier, wherein transmitting the SRSs over the multiple symbols within the slot on the first carrier before tuning back to the second carrier is in accordance with the capability message.

Aspect 4: The method of aspect 3, further comprising: determining that the UE completes transmission of the SRSs over the multiple symbols; and tuning back to the second carrier before the duration expires based at least in part on the determining.

Aspect 5: The method of any of aspects 1 through 4, further comprising: receiving, from the base station, an indication of a duration for which the UE is to remain tuned to the first carrier after tuning to the first carrier, wherein transmitting the SRSs over the multiple symbols within the slot on the first carrier before tuning back to the second carrier is in accordance with the indication of the duration.

Aspect 6: The method of aspect 5, wherein receiving the indication of the duration comprises receiving the indication of the duration in the SRS configuration.

Aspect 7: The method of any of aspects 1 through 6, wherein the multiple symbols within the slot are discontinuous symbols.

Aspect 8: The method of any of aspects 1 through 6, wherein at least two symbols of the multiple symbols within the slot are continuous symbols.

Aspect 9: The method of any of aspects 1 through 8, wherein the SRS configuration comprises an allocation of resources for transmitting the SRSs on the first carrier over the multiple symbols.

Aspect 10: The method of any of aspects 1 through 9, wherein the first carrier is configured for downlink carrier aggregation.

Aspect 11: A method for wireless communication at a base station, comprising: receiving, from a UE, a capability message indicating that the UE supports transmitting sounding reference signals (SRSs) on a first carrier over multiple symbols within a slot before tuning back to a second carrier different from the first carrier on which the base station communicates with the UE during the slot; transmitting, to the UE, a control message that indicates an SRS configuration for the UE to transmit the SRSs on the first carrier over the multiple symbols within the slot; and receiving the SRSs over the multiple symbols within the slot on the first carrier in accordance with the capability message.

Aspect 12: The method of aspect 11, wherein the capability message indicates that the UE supports tuning to a different carrier once per slot to transmit one or more SRSs.

Aspect 13: The method of any of aspects 11 through 12, wherein the capability message indicates a duration for which the UE remains tuned to the first carrier after tuning to the first carrier.

Aspect 14: The method of any of aspects 11 through 13, further comprising: transmitting, to the UE, an indication of a duration for which the UE is to remain tuned to the first carrier after tuning to the first carrier, wherein receiving the SRSs over the multiple symbols within the slot on the first carrier is in accordance with the indication of the duration.

Aspect 15: The method of aspect 14, wherein transmitting the indication of the duration comprises transmitting the indication of the duration in the SRS configuration.

Aspect 16: The method of any of aspects 11 through 15, wherein the multiple symbols within the slot are discontinuous symbols.

Aspect 17: The method of any of aspects 11 through 15, wherein at least two symbols of the multiple symbols within the slot are continuous symbols.

Aspect 18: The method of any of aspects 11 through 17, wherein the SRS configuration comprises an allocation of resources for transmitting the SRSs on the first carrier over the multiple symbols.

Aspect 19: The method of any of aspects 11 through 18, wherein the first carrier is configured for downlink carrier aggregation.

Aspect 20: An apparatus for wireless communication at a UE, comprising at least one processor; memory coupled with the at least one processor; and instructions stored in the memory and executable by the at least one processor to cause the apparatus to perform a method of any of aspects 1 through 10.

Aspect 21: An apparatus for wireless communication at a UE, comprising at least one means for performing a method of any of aspects 1 through 10.

Aspect 22: A non-transitory computer-readable medium storing code for wireless communication at a UE, the code comprising instructions executable by at least one processor to perform a method of any of aspects 1 through 10.

Aspect 23: An apparatus for wireless communication at a base station, comprising at least one processor; memory coupled with the at least one processor; and instructions stored in the memory and executable by the at least one processor to cause the apparatus to perform a method of any of aspects 11 through 19.

Aspect 24: An apparatus for wireless communication at a base station, comprising at least one means for performing a method of any of aspects 11 through 19.

Aspect 25: A non-transitory computer-readable medium storing code for wireless communication at a base station, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting a capability message indicating that the UE supports remaining tuned to a first carrier to transmit multiple sounding reference signals (SRSs) over multiple symbols within a slot, wherein the first carrier is different from a second carrier on which the UE communicates with a network device during the slot;
   receiving a control message that indicates an SRS configuration for the UE to transmit SRSs on the first carrier over multiple symbols within a first slot;
   tuning to the first carrier in accordance with the control message; and
   transmitting the SRSs over the multiple symbols within the first slot on the first carrier before tuning back to the second carrier based at least in part on the capability message.

2. The method of claim 1,
   wherein the capability message indicates that the UE supports tuning to a different carrier from the second carrier once per slot to transmit one or more SRSs, wherein transmitting the SRSs over the multiple symbols within the first slot on the first carrier before tuning back to the second carrier is in accordance with the capability message.

3. The method of claim 1,
   wherein the capability message indicates a duration for which the UE remains tuned to the first carrier after tuning to the first carrier, wherein transmitting the SRSs over the multiple symbols within the first slot on the first carrier before tuning back to the second carrier is in accordance with the capability message.

4. The method of claim 3, further comprising:
   determining that the UE completes transmission of the SRSs over the multiple symbols; and
   tuning back to the second carrier before the duration expires based at least in part on the determining.

5. The method of claim 1, further comprising:
   receiving, from the network device based at least in part on the capability message, an indication of a duration for which the UE is to remain tuned to the first carrier after tuning to the first carrier, wherein transmitting the SRSs over the multiple symbols within the first slot on the first carrier before tuning back to the second carrier is in accordance with the indication of the duration.

6. The method of claim 5, wherein receiving the indication of the duration comprises receiving the indication of the duration in the SRS configuration.

7. The method of claim 1, wherein a duration for which the UE remains tuned to the first carrier after tuning to the first carrier comprises one or more of a first duration specific to a first radio access technology, a second duration specific to a second radio access technology, or both.

8. The method of claim 1, wherein the multiple symbols within the first slot are discontinuous symbols.

9. The method of claim 1, wherein at least two symbols of the multiple symbols within the first slot are continuous symbols.

10. The method of claim 1, wherein the SRS configuration comprises an allocation of resources for transmitting the SRSs on the first carrier over the multiple symbols.

11. The method of claim 1, wherein the first carrier is configured for downlink carrier aggregation.

12. A method for wireless communication at a network device, comprising:

receiving, from a user equipment (UE), a capability message indicating that the UE supports remaining tuned to a first carrier to transmit multiple sounding reference signals (SRSs) over multiple symbols within a slot before tuning back to a second carrier different from the first carrier on which the network device communicates with the UE during the slot;

transmitting, to the UE, a control message that indicates an SRS configuration for the UE to transmit the SRSs on the first carrier over the multiple symbols within the slot; and receiving the SRSs over the multiple symbols within the slot on the first carrier in accordance with the capability message.

13. The method of claim 12, wherein the capability message indicates that the UE supports tuning to a different carrier once per slot to transmit one or more SRSs.

14. The method of claim 12, wherein the capability message indicates a duration for which the UE remains tuned to the first carrier after tuning to the first carrier.

15. The method of claim 14, wherein the duration comprises one or more of a first duration specific to a first radio access technology, a second duration specific to a second radio access technology, or both.

16. The method of claim 12, further comprising:
transmitting, to the UE, an indication of a duration for which the UE is to remain tuned to the first carrier after tuning to the first carrier, wherein receiving the SRSs over the multiple symbols within the slot on the first carrier is in accordance with the indication of the duration.

17. The method of claim 16, wherein the duration comprises one or more of a first duration specific to a first radio access technology, a second duration specific to a second radio access technology, or both.

18. The method of claim 16, wherein transmitting the indication of the duration comprises transmitting the indication of the duration in the SRS configuration.

19. The method of claim 12, wherein the multiple symbols within the slot are discontinuous symbols.

20. The method of claim 12, wherein at least two symbols of the multiple symbols within the slot are continuous symbols.

21. An apparatus for wireless communication at a user equipment (UE), comprising:
at least one processor; and
memory coupled with the at least one processor, the memory storing instructions for the at least one processor to cause the UE to:
transmit a capability message indicating that the UE supports remaining tuned to a first carrier to transmit multiple sounding reference signals (SRSs) over multiple symbols within a slot, wherein the first carrier is different from a second carrier on which the UE communicates with a network device during the slot;
receive a control message that indicates an SRS configuration for the UE to transmit SRSs on the first carrier over multiple symbols within a first slot;
tune to the first carrier in accordance with the control message; and
transmit the SRSs over the multiple symbols within the first slot on the first carrier before tuning back to the second carrier based at least in part on the capability message.

22. The apparatus of claim 21, wherein the capability message indicates that the UE supports tuning to a different carrier from the second carrier once per slot to transmit one or more SRSs, wherein transmitting the SRSs over the multiple symbols within the first slot on the first carrier before tuning back to the second carrier is in accordance with the capability message.

23. The apparatus of claim 21, wherein the capability message indicates a duration for which the UE remains tuned to the first carrier after tuning to the first carrier, wherein transmitting the SRSs over the multiple symbols within the first slot on the first carrier before tuning back to the second carrier is in accordance with the capability message.

24. The apparatus of claim 23, wherein the instructions are further for the at least one processor to cause the UE to:
determine that the UE completes transmission of the SRSs over the multiple symbols; and
tune back to the second carrier before the duration expires based at least in part on the determining.

25. The apparatus of claim 21, wherein the instructions are further for the at least one processor to cause the UE to:
receive, from the network device based at least in part on the capability message, an indication of a duration for which the UE is to remain tuned to the first carrier after tuning to the first carrier, wherein transmitting the SRSs over the multiple symbols within the first slot on the first carrier before tuning back to the second carrier is in accordance with the indication of the duration.

26. The apparatus of claim 25, wherein receiving the indication of the duration comprises receiving the indication of the duration in the SRS configuration.

27. The apparatus of claim 21, wherein a duration for which the UE remains tuned to the first carrier after tuning to the first carrier comprises one or more of a first duration specific to a first radio access technology, a second duration specific to a second radio access technology, or both.

28. The apparatus of claim 21, wherein the multiple symbols within the first slot are discontinuous symbols.

29. The apparatus of claim 21, wherein at least two symbols of the multiple symbols within the first slot are continuous symbols.

30. An apparatus for wireless communication at a network device, comprising:
at least one processor; and
memory coupled with the at least one processor, the memory storing instructions for the at least one processor to cause the network device to:
receive, from a user equipment (UE), a capability message indicating that the UE supports remaining tuned to a first carrier to transmit multiple sounding reference signals (SRSs) over multiple symbols within a slot before tuning back to a second carrier different from the first carrier on which the network device communicates with the UE during the slot;
transmit, to the UE, a control message that indicates an SRS configuration for the UE to transmit the SRSs on the first carrier over the multiple symbols within the slot; and
receive the SRSs over the multiple symbols within the slot on the first carrier in accordance with the capability message.

* * * * *